United States Patent
Nishimura et al.

(10) Patent No.: US 8,578,184 B2
(45) Date of Patent: Nov. 5, 2013

(54) POWER CONTROL SYSTEM FOR DISTRIBUTING POWER TO POWER DEMANDING FACILITY

(75) Inventors: Kazuhito Nishimura, Osaka (JP); Kazuo Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 354 days.

(21) Appl. No.: 13/001,500

(22) PCT Filed: Jun. 16, 2009

(86) PCT No.: PCT/JP2009/060915
§ 371 (c)(1),
(2), (4) Date: Dec. 27, 2010

(87) PCT Pub. No.: WO2009/157342
PCT Pub. Date: Dec. 30, 2009

(65) Prior Publication Data
US 2011/0107123 A1    May 5, 2011

(30) Foreign Application Priority Data
Jun. 27, 2008    (JP) .................................. 2008-168532

(51) Int. Cl.
G06F 1/00    (2006.01)
H02J 13/00    (2006.01)

(52) U.S. Cl.
USPC .............................. 713/300; 700/2; 700/286

(58) Field of Classification Search
USPC ..................................... 713/300; 700/22, 286
See application file for complete search history.

(56) References Cited

U.S. PATENT DOCUMENTS

| | | | |
|---|---|---|---|
| 2002/0033020 A1* | 3/2002 | Tonomura et al. | 60/641.8 |
| 2008/0234871 A1* | 9/2008 | Yamada et al. | 700/286 |
| 2009/0302681 A1* | 12/2009 | Yamada et al. | 307/46 |

FOREIGN PATENT DOCUMENTS

| | | |
|---|---|---|
| CN | 1977436 A | 6/2007 |
| JP | 7-231570 | 8/1995 |
| JP | 2002-10500 | 1/2002 |
| JP | 2002-171674 | 6/2002 |
| JP | 2003-116225 | 4/2003 |
| JP | 2004-208426 | 7/2004 |
| JP | 2007-28735 | 2/2007 |
| JP | 2007-330002 | 12/2007 |
| WO | WO2005/093924 | 10/2005 |

OTHER PUBLICATIONS

International Search Report for PCT/EP2009/060915, mailed Sep. 15, 2009.
International Search Report for PCT/JP2009/060915, mailed Sep. 15, 2009.

* cited by examiner

*Primary Examiner* — Nimesh G Patel
(74) *Attorney, Agent, or Firm* — Nixon & Vanderhye, P.C.

(57) ABSTRACT

A power control system includes a distribution unit distributing power supplied from a power system to a plurality of power demanding facilities, and a measurement unit measuring a value of running power between the power system and the distribution unit. A power control instruction is transmitted to a power demanding facility in the event of the condition of TLP<K1 (K1 indicates a threshold value used to detect reverse power flow) is established when the running power flowing from the power system towards the distribution unit is taken as a positive value. The power control instruction instructs a power storage device performing a discharging process to suppress the amount of power supplied in the direction towards the power system, and instructs a power storage device currently performing a charging process to increase the amount of power charged in a corresponding storage battery.

12 Claims, 6 Drawing Sheets

POWER CONTROL SYSTEM FOR DISTRIBUTING POWER TO POWER DEMANDING FACILITY

This application is the U.S. national phase of International Application No. PCT/JP2009/060915 filed 16 Jun. 2009, which designated the U.S. and claims priority to JP Application No. 2008-168532 filed 27 Jun. 2008, the entire contents of each of which are hereby incorporated by reference.

TECHNICAL FIELD

The present invention relates to power control systems, particularly a power control system for distributing power supplied from a power system to a plurality of power demanding facilities.

BACKGROUND ART

In recent years, attention is focused on various techniques for utilizing power effectively. For example, there is an approach to avoid, as much as possible, cut off of the power supply line having high priority (Patent Document 1: International Publication No. 05/093924). There is also an approach to prevent the flow out of stored power to a system without restricting the power generated from a solar cell (Patent Document 2: Japanese Patent Laying-Open No. 2002-171674).

Moreover, there is an approach (hereinafter, also referred to as first prior art) to prevent reverse power flow that is the flow of power from a facility that requires power (hereinafter, also referred to as "power demanding facility") to a power system that supplies power to the power demanding facility (Patent Document 3: Japanese Patent Laying-Open No. 2004-208426). The power demanding facility is a residence, for example. The power system is a system that supplies power such as at an electric power company.

PRIOR ART DOCUMENT

Patent Documents

Patent Document 1: International Publication No. 05/093924
Patent Document 2: Japanese Patent Laying-Open No. 2002-171674
Patent Document 3: Japanese Patent Laying-Open No. 2004-208426

SUMMARY OF THE INVENTION

Problems to be Solved by the Invention

Increase in reverse power flow, i.e. increase of power flowing from a power demanding facility to a power system, will adversely affect the equipment of the power system such as increase in the voltage involved with the distribution of electricity of the power system. Therefore, preventing reverse power flow is essential.

In recent years, there are more systems for a power system to supply power to multi dwelling houses including a plurality of power demanding facilities (for example, houses). Since the state of power usage differs between each power demanding facility in such a system, power cannot be utilized effectively by just simply preventing the flow of power from each power demanding facility back to the power system in order to eliminate reverse power flow.

The present invention is directed to solving the above problem. An object of the present invention is to provide a power control system allowing effective usage of power while preventing the flow of power towards the power system.

Means for Solving the Problems

In order to achieve the above-described object, a power control system according to an aspect of the present invention includes a plurality of power demanding facilities, a distribution unit having a first connection unit to which an external power system is connected and a second connection unit to which a plurality of power demanding facilities are connected, and a measurement unit measuring the value of running power that is the power flowing between the power system and the distribution unit.

The distribution unit distributes the power supplied from the power system via the first connection unit to the plurality of power demanding facilities.

Each of the plurality of power demanding facilities includes a power generation device generating and providing power to the second connection unit, and a power storage device to which a storage battery is connected and receiving power distributed from the distribution unit.

The power storage device performs a charging process of storing power received at the power storage device in a connected storage battery, and a discharging process of providing at least a portion of the stored power from the storage battery to the second connection unit.

The power control system further includes a condition detection unit detecting whether a condition of (TLP<K1) is established or not, and a power control unit transmitting a power control instruction to the plurality of power demanding facilities when the condition detection unit detects that the condition is established.

TLP refers to the value of the running power measured by the measurement unit with the running power flowing in the direction from the power system towards the distribution unit taken as a positive value. K1 refers to the threshold value used to detect reverse power flow indicative of running power flowing from the distribution unit to the power system.

The power control instruction instructs the power storage device performing a discharging process to suppress the amount of power output from the storage battery and instructs the power storage device performing a charging process to increase the amount of power charged in the storage battery.

Preferably, the power control system further includes a process information reception unit receiving, from each of the plurality of power demanding facilities, process information indicative of the process performed by the power storage device in the relevant power demanding facility with respect to the storage battery connected to the relevant power storage device. The power control unit transmits the power control instruction to the plurality of power demanding facilities based on the process information received by the process information reception unit.

Preferably, the power storage device receives power distributed from the distribution unit, and power output from said power generation device in the plurality of power demanding facilities. A charging process refers to at least one of a first charging process of storing at least a portion of the power distributed from the distribution unit in the storage battery, and a second charging process of storing at least a portion of the power output from the power generation device in the plurality of power demanding facilities in the storage battery.

Preferably, the power storage device includes a current capacity value detection unit detecting a capacity value of current stored in the connected storage battery. Detection is made whether the relevant power battery can be charged or not based on the current capacity value detected by the current capacity value detection unit.

Preferably, when detection is made that charging is allowed, the power storage device increases the amount of power to be charged in the connected storage battery.

Preferably, each of the plurality of power demanding facilities further includes an in-facility measurement unit measuring a value and a flowing direction of in-facility power that is the power flowing between the distribution unit and a power storage device, and an in-facility control unit performing an internal power control process such that the in-facility power is increased when the condition of (INP<L1) is established.

INP refers to the measured in-facility power when the direction from the distribution unit to the power storage device is taken as a positive value, and L1 refers to the in-facility threshold value used to detect power flowing from the power storage device to the distribution unit. The in-facility control unit increases the in-facility threshold value by just a predetermined value when a power control instruction is received.

Preferably, the internal power control process refers to, when the corresponding power storage device is performing a discharging process, a process of suppressing supply of power to the distribution unit by the discharging process. The internal power control process refers to, when the corresponding storage battery is in a chargeable state and the corresponding power storage device is performing a charging process, a process of increasing the power to be charged in the corresponding storage battery by the charging process.

Preferably, the in-facility threshold value of L1 is a value in vicinity to 1.

Preferably, the power control unit controls, until detection is made that the condition of (TLP≥K1) is established, the power storage device performing a discharging process such that the amount of power output from the storage battery connected to the relevant power storage device is suppressed, and the power storage device performing a charging process such that the amount of power charged in said storage battery connected to the relevant power storage device is increased.

Preferably, the threshold value of K1 is a value in vicinity to 0.

Preferably, the power generation device is a photovoltaic unit.

According to another aspect of the present invention, a method for controlling a power system is provided.

The power system includes a plurality of power demanding facilities, a distribution unit having a first connection unit to which an external power system is connected and a second connection unit to which a plurality of power demanding facilities are connected, and a measurement unit measuring the value of running power that is the power flowing between the power system and the distribution unit.

The distribution unit distributes the power supplied from the power system via the first connection unit to the plurality of power demanding facilities, and outputs the power applied via the second connection unit to the power system via the first connection unit.

Each of the plurality of power demanding facilities includes a power generation device generating and providing power to the second connection unit, and a power storage device to which a storage battery is connected and receiving power distributed from the distribution unit or power generated by the power generation device.

The power storage device performs a charging process of storing power received at the power storage device in a connected storage battery, and a discharging process of providing at least a portion of the stored power from the storage battery to the second connection unit.

The method includes the steps of detecting whether a condition of (TLP<K1) is established or not, and transmitting a power control instruction to the plurality of power demanding facilities when detection is made that the condition is established.

TLP refers to the value of the running power measured by the measurement unit with the running power flowing in the direction from the power system to the distribution unit taken as a positive value. K1 refers to the threshold value used to detect reverse power flow indicative of running power flowing from the distribution unit to the power system.

The power control instruction instructs the power storage device performing a discharging process to suppress the amount of power output from the storage battery and instructs the power storage device performing a charging process to increase the amount of power charged in the storage battery.

Effects of the Invention

The power control system of the present invention includes a distribution unit distributing power supplied from a power system to a plurality of power demanding facilities, and a measurement unit measuring a value of running power that is power flowing between the power system and the distribution unit. A power control process is performed such that running power TLP is increased when the condition of TLP<RPO is established, where TLP is the measured running power and the threshold value used to detect reverse power flow is K1, when the direction from the power system to the distribution unit is taken as a positive value. In the power control process, the power storage device performing a discharging process is controlled such that supply of power by the discharging process in the direction towards the power system is suppressed. The power storage device performing a charging process is controlled such that the power charged in the corresponding storage battery is increased.

Thus, power can be used effectively while preventing the occurrence of reverse power flow that is power flowing from a power demanding facility to the power system.

MODES FOR PERFORMING THE INVENTION

Figure 1:
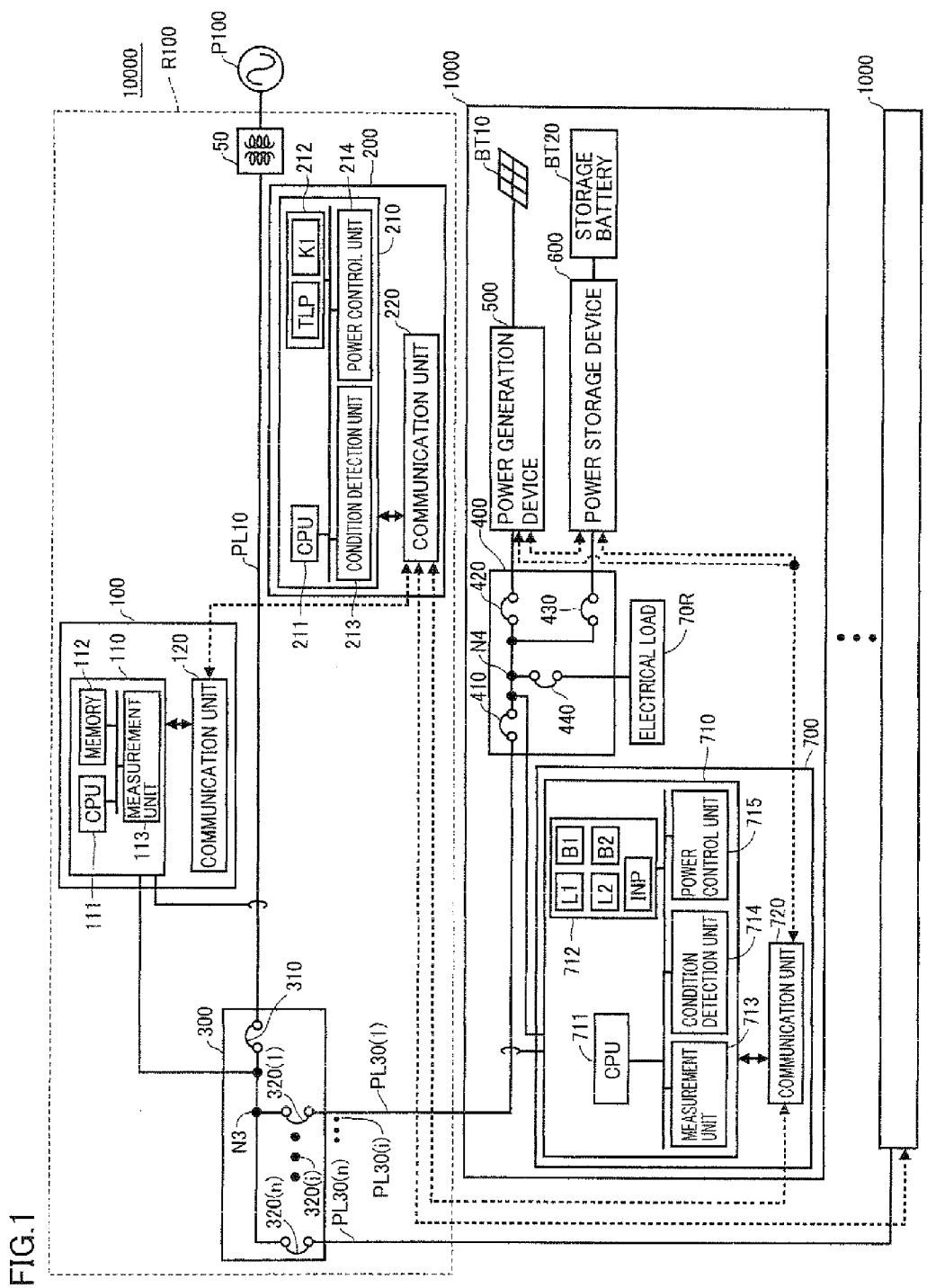
FIG. 1 represents a configuration of a power control system according to an embodiment.

Embodiments of the present invention will be described hereinafter with reference to the drawings. The same components have the same reference character allotted. Their designation and function are also identical. Therefore, detailed description will not be repeated.

First Embodiment

System Configuration

FIG. 1 represents a configuration of a power control system 10000 of the present embodiment. For the sake of illustration, FIG. 1 shows a power system P100. Power system P100 is a commercial facility such as an electric power company supplying power. It is assumed that power control system 10000 is provided at, but not limited to, a multi dwelling housing such as an apartment. Power control system 10000 may be provided at multi dwelling houses constituted of a plurality of single-family houses.

Referring to FIG. 1, power control system 10000 includes a transformer 50, a distribution unit 300, a power measurement device 100, a power control device 200, and a plurality of power demanding facilities 1000.

It is assumed that transformer 50, distribution unit 300, power measurement device 100 and power control device 200 are located in a room R100. In the case where power control system 10000 is provided at an apartment, room R100 is a room in the apartment, and power demanding facility 1000 is a residence in the apartment.

Power system P100 is electrically connected to transformer 50 through a power line. It is assumed that power system P100 supplies the power of 6600V in voltage to transformer 50 through the power line. Transformer 50 converts the power of a voltage level (6600V) supplied from power system P100 into a voltage level (single-phase three-wire 200V) that can be used at each of plurality of power demanding facilities 1000.

Transformer 50 is electrically connected to distribution unit 300 through a power line PL10. Transformer 50 supplies the power of the converted voltage level (hereinafter, also referred to as converted power) to distribution unit 300 through power line PL10.

The above description is based on a configuration in which power system P100 corresponds to a high voltage power of 6600V. In the case where power system P100 corresponds to single-phase three-wire 200V, transformer 50 is dispensable.

Distribution unit 300 is capable of distributing the power flowing through power line PL10 (for example, converted power) to a plurality of power demanding facilities 1000. Distribution unit 300 includes a breaker 310, and a breaker 320 (i) (where i=1, 2, 3, . . . , n (n is a natural number)). In the present embodiment, the breaker is set at an electrically connected state (hereinafter, also referred to as ON state) or an electrically cut of state (hereinafter, also referred to as OFF state) of the power path. In the present embodiment, it is assumed that the breaker is set at an ON state, unless noted otherwise. Breaker 310 is electrically connected to transformer 50 by power line PL10. Breaker 310 is electrically connected to a node N3 through a power line. Each breaker 320 (i) is electrically connected to node N3 through a power line.

Breaker 310 electrically connects transformer 50 with node N3. In this case, the converted power supplied from transformer 50 is delivered to node N3. In the present embodiment, there are n (natural number) power demanding facilities 1000. Therefore, breaker 320 (i) is electrically connected to power demanding facilities 1000 by a relevant power line PL30 (i) (where i=1, 2, 3, . . . , n (n is a natural number)). In the following, power line PL30 (i) may also be simply referred to as power line PL30.

Each breaker 320 electrically connects node N3 with a corresponding power demanding facility 1000. The number of power demanding facilities 1000 may be greater than the value of n (natural number). In this case, a distribution board for branching may be provided between the breaker in distribution unit 300 and a corresponding power demanding facility 1000.

Power measurement device 100 includes a control unit 110, and a communication unit 120.

Control unit 110 includes a CPU (Central Processing Unit) 111 to perform a process on respective elements in power measurement device 100, computing and the like, a memory 112, and a measurement unit 113. Another circuit having a processing function may be employed instead of CPU 111. Measurement unit 113 measures the voltage at node N3 based on control by CPU 111. In the present embodiment, it is assumed that the value of the measured voltage is a positive value, unless noted otherwise. Measurement unit 113 also functions to measure the value of the current flowing through power line PL10.

In the case where the flowing direction of the current through power line PL10 is in the direction from transformer 50 towards breaker 310 (that is, the direction from power system P100 towards distribution unit 300), it is assumed that the current measured by measurement unit 113 takes a positive value. In the case where the flowing direction of the current through power line PL10 is in the direction from breaker 310 towards transformer 50 (that is, in the direction from distribution unit 300 to power system P100), it is assumed that the current measured by measurement unit 113 takes a negative value.

In other words, the current value measured by measurement unit 113 also indicates the flowing direction of the current through power line PL10. This means that measurement unit 113 can also identify the flowing direction of the current through power line PL10. The power is calculated by the product of the current value and voltage value. Therefore, measurement unit 113 can measure (detect) the value of the power flowing through power line PL10.

Further, since the power is calculated by the product of the current value and the voltage value, the flowing direction of the power through power line PL10 is in the direction from power system P100 towards distribution unit 300 when the value of the power measured by measurement unit 113 is positive in the case where the voltage value takes a positive value. In the case where the value of the measured power takes a negative value, the flowing direction of the power through power line PL10 is in the direction from distribution unit 300 towards power system P100. Therefore, measurement unit 113 can measure (detect) the flowing direction of the power through power line PL10.

The site where the voltage and current are to be measured by measurement unit 113 may be either at a site in the proximity of transformer 50 (high voltage side) or at a site in the proximity of distribution unit 300 (low voltage side), provided that the voltage and current of the power flowing through power line PL10 can be measured. Further, measurement unit 113 may be installed at an arbitrary site as long as it is closer to power system P100 than node N3 in distribution unit 300. Since power of lower voltage does not require consideration of breakdown voltage of the voltage detection element, allowing reduction in cost, it is assumed that the voltage and current of the power flowing through power line PL10 are measured at a site in the proximity of distribution unit 300 (low voltage side) in the present embodiment.

Communication unit 120 functions to communicate with control unit 110 and other devices. Communication unit 120 is capable of PLC (Power Line Communications) based on a home flag AV as the communication standard. Since PLC is a communication utilizing the power line, it is not necessary to newly install a communication line. This is advantageous over other communications from the standpoint of cost and communication reliability.

The communication carried out by communication unit 120 is not limited to PLC, and may be another communication. For example, the communication carried out by communication unit 120 may be a wire communication based on the RS (Recommended Standard) 485, wire communication based on Ethernet (registered trademark), wireless communication based on IEEE (Institute of Electrical and Electronic Engineers) 802.11g, and the like.

Power control device 200 includes a control unit 210, and a communication unit 220. Control unit 210 includes a CPU 211 to perform a process on respective elements in power control device 200, computing and the like, a memory 212, a condition detection unit 213, and a power control unit 214. Condition detection unit 213 detects whether a predetermined condition to detect reverse power flow that will be described afterwards is established or not. Power control unit 214 transmits a power control instruction to each power demanding facility 1000. The data stored in memory 212 will be described afterwards.

By incorporating a process corresponding to the functions of condition detection unit 213 and power control unit 214 into the process executed by CPU 211, condition detection unit 213 and power control unit 214 may be omitted.

Communication unit 220 is capable of communicating with control unit 210 and other devices. Communication unit 220 functions to carry out communication similar to that of communication unit 120 set forth above. In other words, communication unit 220 is capable of PLC. Communication unit 220 communicates with communication unit 120.

Power demanding facility 1000 includes a distribution board 400, and an electrical load 70R.

Distribution board 400 includes breakers 410, 420, 430 and 440. It is assumed that power demanding facility 1000 is electrically connected to breaker 320 (1). In this case, breaker 410 is electrically connected with breaker 320 (1) through power line PL30 (1) (power line PL30). Further, breaker 410 is electrically connected to a node N4 through a power line. Breaker 410 electrically connects breaker 320 (1) with node N4.

Breaker 440 is electrically connected to node N4 and electrical load 70R through a power line. Electrical load 70R is a device that operates by consuming power. Electrical load 70R is, for example, a refrigerator, an air conditioner, a washing machine, or the like. Breaker 440 electrically connects electrical load 70R with node N4. In other words, distribution board 400 can provide the power supplied to the relevant distribution board 400 to electrical load 70R.

Power demanding facility 1000 further includes a power measurement device 700. Power measurement device 700 includes a control unit 710 and a communication unit 720.

Control unit 710 includes a CPU 711 to perform a process on respective elements in power measurement device 700, computing and the like, a memory 712, a measurement unit 713, a condition detection unit 714 to detect reverse power flow that will be described afterwards, and a power control unit 715. Power control unit 715 controls the charging and discharging by power storage device 600 that will be described afterwards, and the power generation by power generation device 500. The data stored in memory 712 will be described afterwards.

By incorporating a process corresponding to the functions of condition detection unit 714 and power control unit 715 to the process executed by CPU 711, condition detection unit 714 and power control unit 715 may be omitted.

Measurement unit 713 measures the voltage at node N4 based on control by CPU 711. Measurement unit 713 measures (detects) the value of the current flowing through power line PL30 (for example, power line PL30 (1)) between a corresponding breaker (breaker 320) (1)) and breaker 410.

In the case where the flowing direction of the current through power line PL30 is in the direction from distribution unit 300 towards distribution board 400, it is assumed that the value of the current measured by measurement unit 713 is positive. In the case where the flowing direction of the current through power line PL30 is in the direction from distribution board 400 towards distribution unit 300 (power system P100), it is assumed that the value of the current measured by measurement unit 713 is negative.

In other words, the current value measured by measurement unit 113 also indicates the flowing direction of the current through power line PL10. This means that measurement unit 713 can also identify the flowing direction of the current through power line PL30. The power is calculated by the product of the current value and voltage value. Therefore, measurement unit 713 can measure (detect) the value of the power flowing through power line PL30.

Further, since the power is calculated by the product of the current value and the voltage value, the flowing direction of the current through power line PL30 is in the direction from distribution unit 300 towards distribution board 400 when the value of the power measured by measurement unit 713 is positive in the case where the voltage value takes a positive value. In the case where the value of the power measured by measurement unit 713 takes a negative value, the flowing direction of the power through power line PL30 is in the direction from distribution board 400 towards distribution unit 300 (power system P100). Therefore, measurement unit 713 can measure (detect) the flowing direction of the power through power line PL30.

The site where the voltage and current are to be measured by measurement unit 713 is not limited to that shown in FIG. 1, and may at an arbitrary site as long the total power supplied to a corresponding power demanding facility 1000 or the total power supplied from power demanding facility 1000 can be measured.

Communication unit 720 is capable of communicating with control unit 710 and other devices. Communication unit 720 functions to perform communication similar to that of communication unit 120 set forth above. Namely, communication unit 720 is capable of PLC. Communication unit 720 communicates with communication unit 220 of power control device 200 and power storage device 600 that will be described afterwards.

Power demanding facility 1000 further includes a power generation device 500 and a solar cell BT10.

Solar cell BT10 generates power utilizing sunlight, and supplies the generated power to power generation device 500. Solar cell BT10 has a plurality of solar cells connected in series such that the supplied voltage attains the level of DC (Direct Current) 100V to DC 350V. It is assumed that the maximum output power of solar cell BT10 is 3 kW.

The maximum output power of solar cell BT10 is not limited to 3 kW, and may be another value (for example, any value in the range of 3 to 5 kW). In the case where power control system 10000 is provided at an apartment, solar cell BT10 is installed at the roof of the apartment.

Power generation device 500 is a solar power conditioner in cooperation with a low voltage system, functioning to carry out a power generation process of converting the DC power obtained at solar cell BT10 into AC power, and supply the converted power to distribution board 400. Power generation device 500 is not limited to a solar power conditioner, and may be a power conditioner utilizing the power generated by a fuel cell, a wind power generator, or the like. Power generation device 500 is controlled such that maximum power can be obtained from solar cell BT10 (hereinafter, also referred to as "maximum power following control").

Breaker 420 included in distribution board 400 is electrically connected to node N4 and power generation device 500 through a power line. Breaker 420 electrically connects node N4 with power generation device 500.

Power control system 10000 is not limited to the configuration described above. For example, power measurement device 100 and power control device 200 may be implemented by one device.

Figure 2:
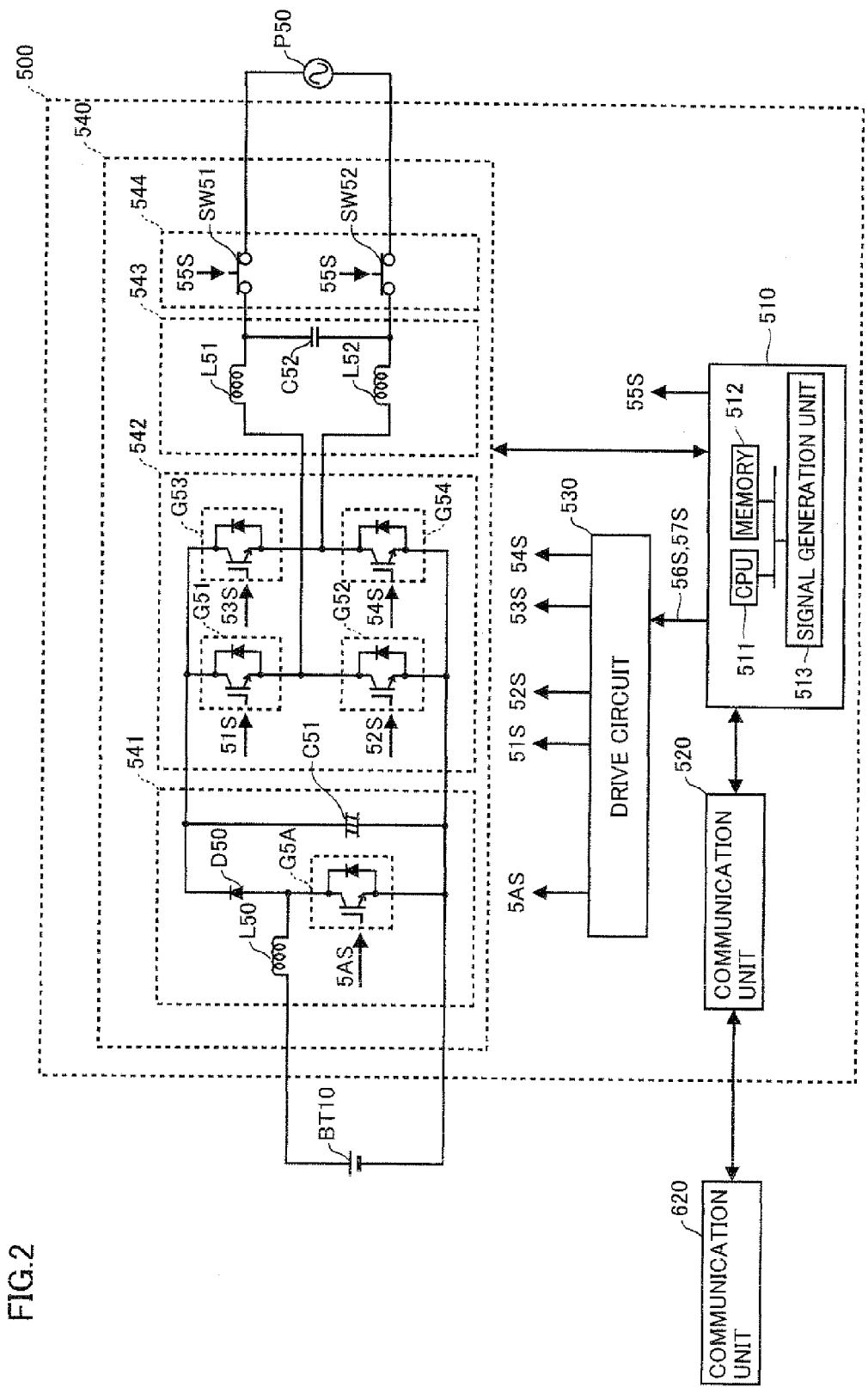
FIG. 2 is a block diagram representing an internal configuration of a power generation device.

FIG. 2 is a block diagram to describe an internal configuration of power generation device 500. For the sake of illustration, FIG. 2 shows solar cell BT10, a communication unit 620 that will be described afterwards, and a voltage supply P50 of 200V AC (Alternating Current).

Referring to FIG. 2, power generation device 500 includes a conversion circuit 540. Conversion circuit 540 functions to convert the DC current obtained by solar cell BT10 into AC power.

Power generation device 500 further includes a control unit 510, a communication unit 520, and a drive circuit 530.

Control unit 510 includes a CPU 511 to perform a process on respective elements in power generation device 500, computing and the like, a memory 512, and a signal generation unit 513. Signal generation unit 513 generates a pulse signal 55S, a pulse width reduction instruction 56S, and a pulse width increase instruction 57S under control of CPU 511.

In the following description, a binary high voltage state (for example, power supply voltage Vcc) and a low voltage state (for example, ground voltage GND) of a signal, data and the like are also referred to as an H level ("1") and an L level ("0"), respectively. The pulse signal is a signal of a voltage of an L level and an H level.

Communication unit 520 is capable of communicating with control unit 510 and other devices. Communication unit 520 functions to carry out a communication similar to that of communication unit 120 set forth above. Communication unit 520 communicates with communication unit 620 that will be described later.

Drive circuit 530 generates and outputs a pulse signal (pulse signals 5AS, 51S, 52S, 53S and 54S) to operate conversion circuit 540 based on pulse width reduction instruction 56S and pulse width increase instruction 57S from signal generation unit 513 of control unit 510. Drive circuit 530 alters the width of the E1 level of the output pulse signal (pulse width) based on pulse width reduction instruction 56S and pulse width increase instruction 57S.

Conversion circuit 540 includes a boost circuit 541, an inverter circuit 542, a filter circuit 543, and a relay circuit 544.

Boost circuit 541 is electrically connected with solar cell BT10. Boost circuit 541 functions to boost the voltage obtained by solar cell BT10 up to the level of approximately 380V DC. Boost circuit 541 supplies the boosted voltage to inverter circuit 542.

Boost circuit 541 includes a reactor L50, a diode D50, a switch circuit G5A, and an electrolytic capacitor C51. Switch circuit G5A can be implemented by an IGBT (Insulated Gate Bipolar Transistor), or a MOSFET (Metal Oxide Semiconductor Field Effect Transistor). It is assumed that a MOSFET is employed here.

A pulse signal 5AS output from drive circuit 530 is input to the gate of the MOSFET in switch circuit G5A. Current flows across the source and drain of the MOSFET in switch circuit G5A when a signal of an H level (pulse signal 5AS) is input to the gate.

Boost circuit 541 is under control of control unit 510 (pulse signal 5AS) to effect control so as to constantly obtain the maximum power from solar cell BT10 (hereinafter, also referred to as "maximum power following control").

Inverter circuit 542 functions to convert the DC voltage supplied from boost circuit 541 into AC voltage. Inverter circuit 542 includes switch circuits G51, G52, G53 and G54. Each of switch circuits G51, G52, G53 and G54 may be implemented by an IGBT or MOSFET. It is assumed that an IGBT is employed here. The gates of the four IGBTs in switch circuits G51, G52, G53 and G54 receive pulse signals 51S, 52S, 53S and 54S, respectively. The IGBT in each of switch circuits G51, G52, G53 and G54 functions similarly as the MOSFET included in switch circuit G5A. Therefore, detailed description will not be repeated.

Inverter circuit 542 functions to suppress the output AC voltage by pulse signals 51S, 52S, 53S and 54S output from drive circuit 530.

Filter circuit 543 functions to smooth and shape the waveform of the AC voltage generated by inverter circuit 542. Filter circuit 543 includes reactors L51 and L52, and a capacitor C52.

Relay circuit 544 includes relays SW51 and SW52. Each of relays SW51 and SW52 operates in response to pulse signal 55S. Specifically, each of relays SW51 and SW52 electrically connects filter circuit 543 with voltage supply P50 when pulse signal 55S of an H level is input. When pulse signal 55S of an L level is input, each of relays SW51 and SW52 sets filter circuit 543 and voltage supply P50 in an electrical non-connected state.

Voltage supply P50 represents the AC voltage supplied from the part of power system P100 to breaker 420 of FIG. 1. When relay circuit 544 is ON, voltage of 200V AC is supplied to inverter circuit 542 via relay circuit 544 and filter circuit 543. Inverter circuit 542 outputs an AC current towards breaker 420 via filter circuit 543 and relay circuit 544. When relay circuit 544 is OFF, inverter circuit 542 ceases output of AC current.

For the sake of simplifying illustration of the connection state, FIG. 2 shows two lines connected to voltage supply P50. In practice, voltage supply P50 of 200V AC has a configuration allowing connection with two voltage supplies of 100V AC, and a single-phase 3-wire 200V constituted of three-wires.

Conversion circuit 540 is not limited to the circuit configuration set forth above corresponding to FIG. 2. Any configuration is allowed as long as the DC power obtained by solar cell BT10 can be converted into AC power.

Referring to FIG. 1 again, power demanding facility 1000 further includes a power storage device 600, and a storage battery BT20. It is assumed that storage battery BT20 is a lithium ion battery. Storage battery BT20 can be charged to a power amount of 8 kWh. Let the maximum output power of solar cell BT10 be 3 kW, as mentioned before.

In the following, the amount of power allowed to be charged in storage battery BT20 is also referred to as tolerable charging power. Namely, the tolerable charging power of storage battery BT20 is 8 kWh. In the following, the state of storage battery BT20 where the amount of power stored therein is equal to the tolerable charging power is also referred to as a full-charged state. A state of storage battery BT20 having no power stored therein due to a discharging process is referred to as a discharge final state.

Storage battery BT20 is not limited to a lithium ion battery, and may be any device as long as electrical energy of a large capacity can be stored. Storage battery BT20 may be a secondary cell that converts electrical energy into chemical energy such as a lead-acid battery, nickel-metal hydride battery, a redox flow battery, sodium-sulfur battery, or an electric double layer capacitor that directly stores the electrical energy such as a lithium ion capacitor. Storage battery BT20 has a plurality of secondary cells connected in series such that the output voltage attains the level of 150V to 250V.

Power storage device 600 is a storage battery power conditioner capable of a charging process to store power in storage battery BT20, and a discharging process to discharge power stored in storage battery BT20. In the case where storage battery BT20 attains a full-charged state by a charging process, power storage device 600 ceases the charging process, and attains a state where neither a charging process nor a discharging process is carried out. In the case where storage battery BT20 attains a discharge final state by a discharging process, power storage device 600 ceases its discharging process, and attains a state where neither a charging process nor a discharging process is carried out.

Power storage device 600 may be a device that does not employ a storage battery. In this case, power storage device 600 may be a device such as an electric double layer capacitor, a superconductive power storage device, or the like that stores electrical energy. Moreover, power storage device 600 may be a flywheel power storage device that converts electrical energy into dynamic energy for storage.

Breaker 430 in distribution board 400 is electrically connected to node N4 and power storage device 600 through a power line. Breaker 430 electrically connects node N4 with power storage device 600.

Power from distribution unit 300 is supplied to distribution board 400. In the case where a corresponding power storage device 600 is performing a discharging process, power is supplied from the corresponding power storage device 600 to distribution board 400. In the case where a corresponding power generation device 500 is performing a power generation process, power from the corresponding power generation device 500 is supplied to distribution board 400. Further, in the case where a corresponding power storage device 600 is performing a discharging process and a corresponding power generation device 500 is performing a power generation process, power is supplied from the corresponding power storage device 600 and the corresponding power generation device 500 to distribution board 400.

In the case where power is supplied from distribution unit 300 to distribution board 400, and a corresponding power storage device 600 is performing a charging process, at least a portion of the power supplied from distribution unit 300 to distribution board 400 is charged in a corresponding storage battery BT20 by the charging process carried out by the corresponding power storage device 600.

In the case where power is supplied from a power storage device 600 performing a discharging process to distribution board 400, and the total amount of power supplied to distribution board 400 is greater than the amount of power consumed by electrical load 70R, at least a portion of the power supplied from power storage device 600 performing a discharging process to distribution board 400 is transmitted to distribution unit 300.

Distribution board 400 only serves to establish electrical connection between the devices, and the flow of power is naturally determined by the output state of each device and/or magnitude of the electrical load.

Let power demanding facility 1000 connected to power line PL30 (1) be called power demanding facility A. Let power demanding facility 1000 connected to power line PL30 (n) be called power demanding facility B. It is assumed that power storage device 600 in power demanding facility A is performing a charging process currently. Furthermore, it is assumed that power generation device 500 in power demanding facility B is performing a power generation process, and power demanding facility B is supplying at least a portion of the power obtained by the power generation process to distribution unit 300.

In this case, at least a portion of the power obtained by the relevant power generation process, supplied to distribution unit 300 by power demanding facility B, may be charged in storage battery BT20 in power demanding facility A via distribution unit 300 through the charging process performed by power storage device 600 in power demanding facility A.

In other words, for power demanding facility A including power storage device 600 that is performing a charging process, at least a portion of the power fed towards power system P100 by the power generation process carried out at a power generation device 500 in another power demanding facility, i.e. power demanding facility B, can be stored at storage battery BT20 in power demanding facility A.

The power supplied to distribution unit 300 by a power demanding facility can be used effectively by another power demanding facility. In other words, a plurality of power demanding facilities 1000 can effectively utilize power through distribution unit 300.

Figure 3:
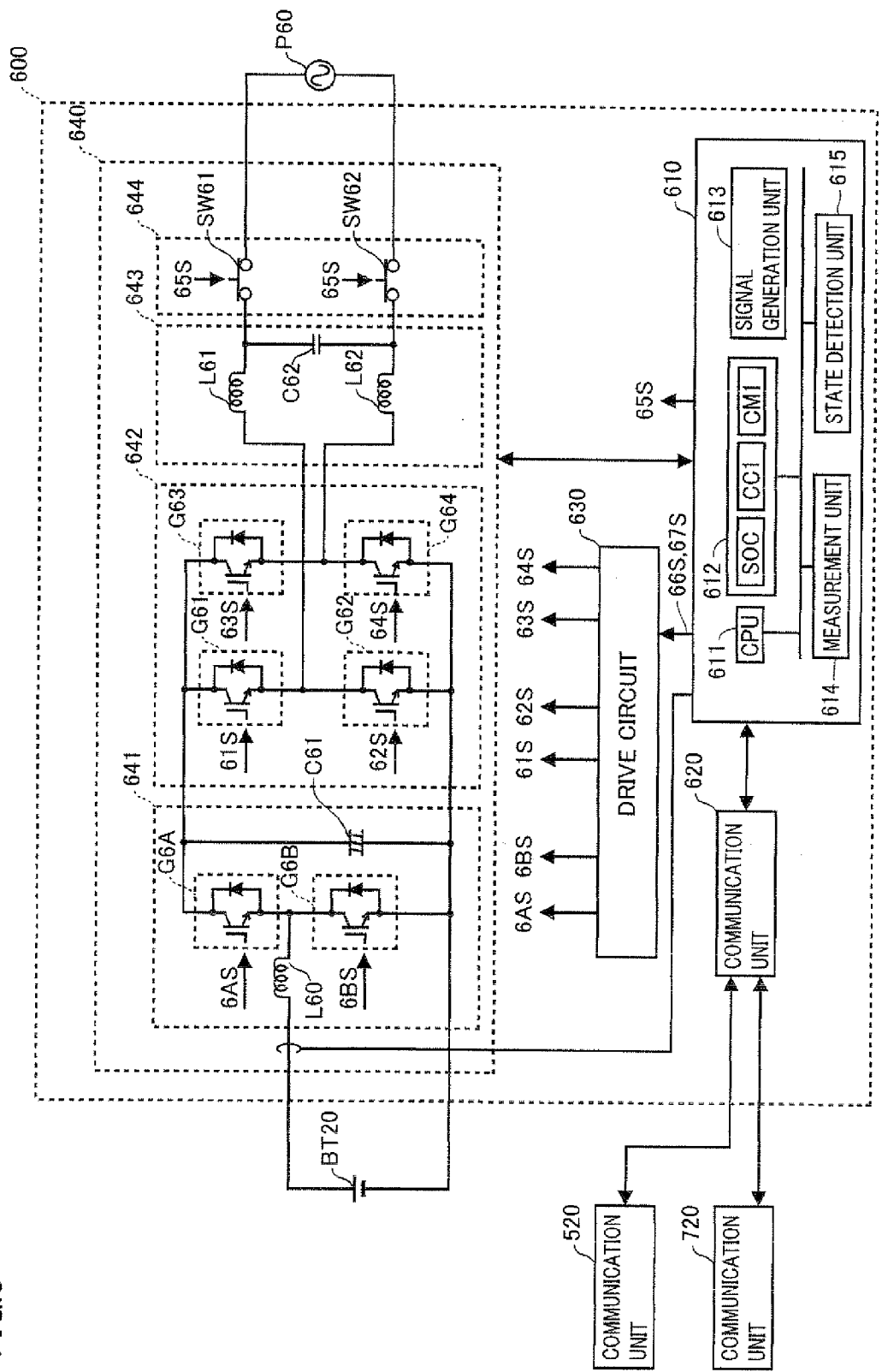
FIG. 3 is a block diagram representing an internal configuration of a power storage device.

FIG. 3 is a block diagram representing an internal configuration of power storage device 600. For the sake of illustration, FIG. 3 shows storage battery BT20, communication unit 520 in power generation device 500, voltage supply P60, and communication unit 720 in power measurement device 700.

Referring to FIG. 3, power storage device 600 includes a charge/discharge circuit 640. Charge/discharge circuit 640 is capable of a charging process to store power in storage battery BT20 and a discharging process to discharge the power stored in storage battery BT20.

Power storage device 600 also includes a control unit 610, a communication unit 620, and a drive circuit 630.

Control unit 610 includes a CPU 611 to perform a process on respective elements in power storage device 600, computing and the like, a memory 612, a signal generation unit 613, a measurement unit 614, and a state detection unit 615. Signal generation unit 613 generates and outputs a pulse signal 65S, a pulse width reduction instruction 66S, and a pulse width increase instruction 67S under control of CPU 611. Measurement unit 614 measures (detects) the value and flowing direction of the current through the power line connecting storage battery BT20 and reactor L60 that will be described afterwards in power storage device 600 under control of CPU 611. The data stored in memory 612 will be described afterwards.

State detection unit 615 constantly detects whether charge/discharge circuit 640 is performing any of a charging process and a discharging process, or whether charge/discharge circuit 640 is not performing any of the charging process and a discharging process, based on the detection result of measurement unit 614. Namely, detection is constantly made whether power storage device 600 is performing the process of either a charging process or a discharging process, or whether power storage device 600 is not performing any of the charging process and discharging process.

Communication unit 620 is capable of communicating with control unit 610 and other devices. Communication unit 620 functions to perform communication similar to that of communication unit 120 set forth above. Communication unit 620 communicates with communication unit 520 in power generation device 500 and communication unit 720 in power measurement device 700.

Each of communication units 120, 220, 520, 620 and 720 shown in FIGS. 1, 2 and 3 are capable of sending the received data to the destination of the received data regardless of whether there is an instruction from a corresponding control unit or not. Namely, each of communication units 120, 220, 520, 620 and 720 is capable of communication with an arbitrary communication unit.

For example, in the case where communication unit 120 receives data addressed to power generation device 500 from control unit 110 (hereinafter, referred to as "power generation device addressed data"), communication unit 120 transmits the power generation device addressed data to communication unit 220, and communication unit 220 transmits the received power generation device addressed data to communication unit 720. Communication unit 720 transmits the received power generation device addressed data to communication unit 620, and communication unit 620 transmits the received power generation device addressed data to communication unit 520 in power generation device 500.

Further, communication unit 720, for example, communicates with communication unit 620 in power storage device 600, and can communicate with communication unit 520 in power generation device 500 utilizing communication unit 620 in power storage device 600. Therefore, communication unit 120 in power measurement device 100 can communicate with communication unit 620 in power storage device 600 utilizing communication unit 220 and communication unit 720. Moreover, communication unit 120 in power measurement device 100 can communicate with communication unit 520 in power generation device 500 utilizing communication unit 220, communication unit 720, and communication unit 620.

The communication form of each of communication units 120, 220, 520, 620 and 720 is not limited to the form shown in FIGS. 1, 2 and 3. For example, the communication units may be configured such that communication unit 220 is capable of communication directly with communication unit 520 in power generation device 500 and communication unit 620 in power storage device 600.

Drive circuit 630 responds to pulse width reduction instruction 66S and pulse width increase instruction 67S from signal generation unit 613 to generate and output a pulse signal (pulse signals 6AS, 6BS, 61S, 62S, 63S and 64S) directed to operating charge/discharge circuit 640. Drive circuit 630 alters the width of the H level of the output pulse signal (pulse width) based on pulse width reduction instruction 66S and pulse width increase instruction 67S.

Charge/discharge circuit 640 includes a bidirectional chopper 641, a bidirectional inverter circuit 642, a filter circuit 643, and a relay circuit 644.

Bidirectional chopper 641 is electrically connected with storage battery BT20. When charge/discharge circuit 640 performs a discharging process (hereinafter, also referred to as "discharging process execution mode"), bidirectional chopper 641 is capable of boosting the level of the voltage obtained from storage battery BT20 to the level of approximately 380V DC. In a discharging process execution mode, bidirectional chopper 641 supplies the boosted voltage to bidirectional inverter circuit 642.

Bidirectional chopper 641 includes a reactor L60, a switch circuit G6A, a switch circuit G6B, and an electrolytic capacitor C61. Each of switch circuit G6A and switch circuit G6B is a MOSFET.

Pulse signal 6AS output from drive circuit 630 is applied to the gate of the MOSFET in switch circuit G6A. The MOSFET in switch circuit G6A conducts current across the source and drain when a signal of an H level (pulse signal 6AS) is applied to the gate of the MOSFET in switch circuit G6A. Pulse signal 6BS output from drive circuit 630 is applied to the gate of the MOSFET in switch circuit G6B. The MOSFET in switch circuit G6B has a function similar to that of the MOSFET in switch circuit G6A. Therefore, detailed description thereof will not be repeated.

Bidirectional inverter circuit 642 is capable of converting the DC voltage supplied from bidirectional chopper 641 into AC voltage in a discharging process execution mode. Bidirectional inverter circuit 642 includes switch circuits G61, G62, G63 and G64. Each of switch circuits G61, G62, G63 and G64 is an IGBT. Pulse signals 61S, 62S, 63S and 64S are applied to the gates of the four IGBTs in switch circuits G61, G62, G63 and G64, respectively. The IGBT included in each of switch circuits G61, G62, G63 and G64 has a function similar to that of the MOSFET in switch circuit G6A. Therefore, detailed description thereof will not be repeated.

Filter circuit 643 is capable of smoothing and shaping the waveform of the AC voltage generated by bidirectional inverter circuit 642 in a discharging process execution mode. Filter circuit 643 includes reactors L61 and L62, and a capacitor C62.

Relay circuit 644 includes relays SW61 and SW62. Each of relays SW61 and SW62 operates in response to pulse signal 65S. Specifically, each of relays SW61 and SW62 electrically connects filter circuit 643 with voltage supply P60 when pulse signal 65S of an H level is input. When pulse signal 65S of an L level is input, each of relays SW61 and SW62 sets filter circuit 643 and voltage supply P60 in an electrically non-connected state.

Voltage supply P60 represents the AC voltage supplied from the part of power system P100 to breaker 430 in FIG. 1. When relay circuit 644 is ON, voltage of 200V AC is supplied to bidirectional inverter circuit 642 via relay circuit 644 and filter circuit 643. Bidirectional inverter circuit 642 outputs the AC current towards breaker 420 via filter circuit 643 and relay circuit 644. When relay circuit 644 is OFF, bidirectional inverter circuit 642 ceases output of AC current.

Although FIG. 3 shows two lines connected to voltage supply P60 for the sake of simplifying representation of the connection state, voltage supply P60 is configured allowing processing with two voltage supplies, and a single-phase 3-wire 200V constituted of three-wires.

When charge/discharge circuit 640 performs a charging process (hereinafter, also referred to as "charging process execution mode"), the AC voltage supplied from breaker 430 is fed to filter circuit 643 via relay circuit 644. Filter circuit 643 and bidirectional inverter circuit 642 together carry out the shaping and boosting operation of an AC voltage. In a charging process execution mode, the AC voltage supplied to filter circuit 643 is converted into DC voltage of 380V DC, which is supplied to bidirectional chopper 641. In a charging process execution mode, bidirectional chopper 641 reduces the DC voltage supplied from bidirectional inverter circuit 642 to a level that can be used at storage battery BT20 and charges storage battery BT20.

Measurement unit 614 of control unit 610 measures the current flowing across storage battery BT20 and reactor L60, as set forth above. Measurement unit 614 accumulates the charging current flowing towards storage battery BT20 as a positive value in a charging process execution mode, and accumulates the discharging current flowing towards reactor L60 from storage battery BT20 as a negative value in a discharging process execution mode. Measurement unit 614 functions as a current capacity value detection unit. Specifically, measurement unit 614 constantly calculates the difference between the accumulated charging current and the accumulated discharging current to detect the capacity value of the current stored in storage battery BT20 (hereinafter, also referred to as "stored current capacity value") CC1 at the current point of time, and stores the value in memory 612.

Let the value of the current capacity of storage battery BT20 in a full-charged state (hereinafter, also referred to as "maximum current capacity value") CM1 be prestored in memory 612. State detection unit 615 constantly calculates a state of charge (SOC) value obtained by dividing the stored current capacity value by the maximum current capacity value and multiplying the result by 100, which is stored in memory 612. The state of charge value is in the range of 0 to 100, and the unit is represented in %. For example, when stored current capacity value CC1 is equal to maximum current capacity value CM1, the state of charge value is 100(%), indicating that storage battery BT20 is in a full-charged state. In other words, the state of charge value SOC represents the charged state of storage battery BT20.

Charge/discharge circuit 640 is not limited to the above-described circuit configuration. Any circuit configuration that allows a charging process to store power in storage battery BT20 and a discharging process to discharge the power stored in storage battery BT20 may be employed, and is not limited to that of FIG. 3.

Referring to FIG. 1 again, power demanding facility 1000 of the present embodiment is based on a configuration including both a power generation device 500 and a power storage device 600. Power demanding facility 1000 is not limited thereto, and may be configured with power generation device 500 and without power storage device 600.

In order to suppress the power flowing from each power demanding facility 1000 towards distribution unit 300 as much as possible, power demanding facility 1000 preferably is configured to include both power generation device 500 and power storage device 600. If power demanding facility 1000 includes a power generation device 500 and not a power storage device 600, the output of power obtained at power generation device 500 has to be suppressed in order to suppress the power flowing towards distribution unit 300 from power demanding facility 1000. This means that power that can be fundamentally generated will be wasted. This is not preferable from the standpoint of utilizing energy effectively.

(Power Control Method)

The process carried out by power control system 10000 to prevent the flow of power towards power system P100 will be described hereinafter.

First, the process of power measurement device 100 measuring the value of the power flowing through power line PL10 (hereinafter, also referred to as "power measurement process") will be described. The process carried out by power measurement device 100 in a power measurement process is also referred to as a power measurement process DT. Power measurement process DT is carried out independent of other processes. In the following, the process carried out by power control device 200 in a power measurement process is also referred to as a power measurement process CT. Power measurement process CT is carried out independent of other processes.

Figure 4:
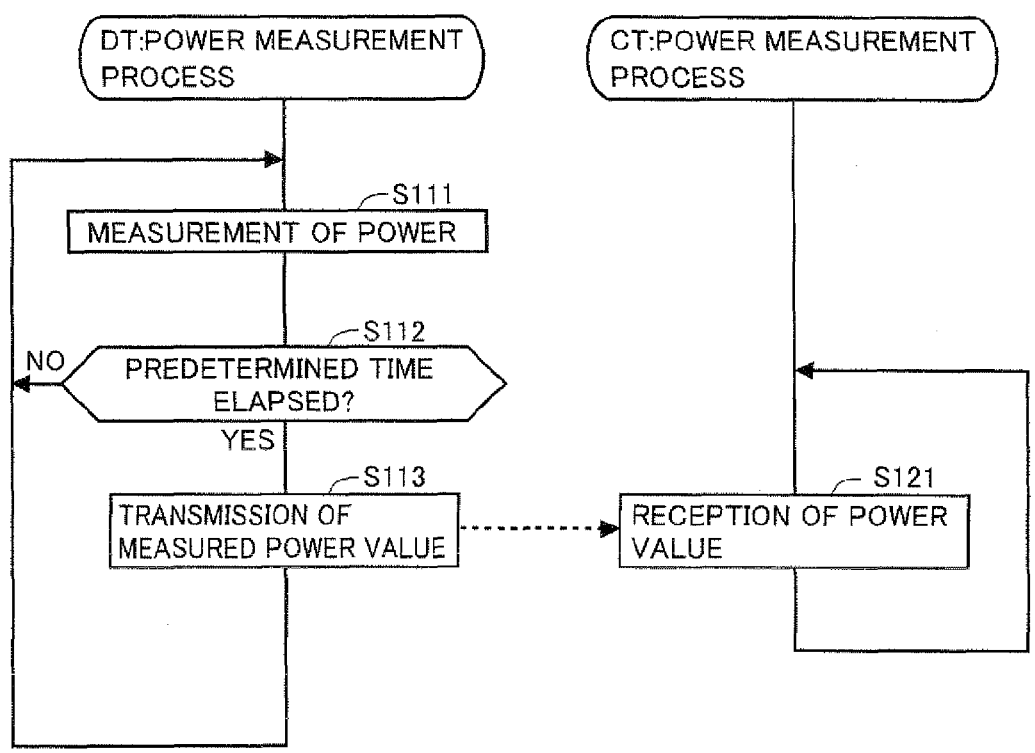
FIG. 4 is a flowchart of a power measurement process DT and a power measurement process CT.

FIG. 4 is a flowchart of power measurement process DT and power measurement process CT. Referring to FIG. 4, the process of step S111 is first carried out in power measurement process DT.

At step S111, measurement unit 113 measures the value of the current flowing through power line PL10 and the value of the voltage at node N3. In other words, the value of the power flowing through power line PL10 is measured. Then, control proceeds to step S112.

At step S112, CPU 111 of control unit 110 detects whether a predetermined time elapsed or not by means of a timer not shown. The predetermined time is, for example, 1 second. When YES at step S112, control proceeds to step S113; otherwise (NO at step S112), the process of step S111 is carried out again.

At step S113, measurement unit 113 sends the measured value of power (hereinafter, also referred to as "measured power value") to power control device 200. Then, the process of step S111 is carried out again.

In a power measurement process CT, the process of step S121 is first carried out.

At step S121, a power value reception process is performed. In a power value reception process, control unit 210 receives a measured power value. In power measurement process CT, the process of step S121 is repeated.

By the above-described process, CPU 211 obtains the value of power flowing through power line PL10 (measured power value) at every elapse of a predetermined time. In other words, CPU 211 senses the direction of power flowing through power line PL10 at every elapse of a predetermined time. The measured power value is stored in memory 212, represented as power value TLP.

It is now assumed that current is flowing towards distribution unit 300 from some of power demanding facilities 1000 in power control system 10000.

A process carried out by power control device 200 to prevent the flow of power towards power system P100 (hereinafter, also referred to as "total power control process") will be described hereinafter. In a total power control process, the process carried out by power control device 200 is also referred to as a total power control process CTA.

In a total power control process, the process carried out by each of the plurality of power storage devices 600 included in respective power demanding facilities 1000 in power control system 10000 is also referred to as a total power control process CP. Furthermore, in the total power control process, the process is carried out by each of the plurality of power measurement devices 700 in respective power demanding facilities 1000 in power control system 10000 is also referred to as a total power control process DTA.

Figure 5:
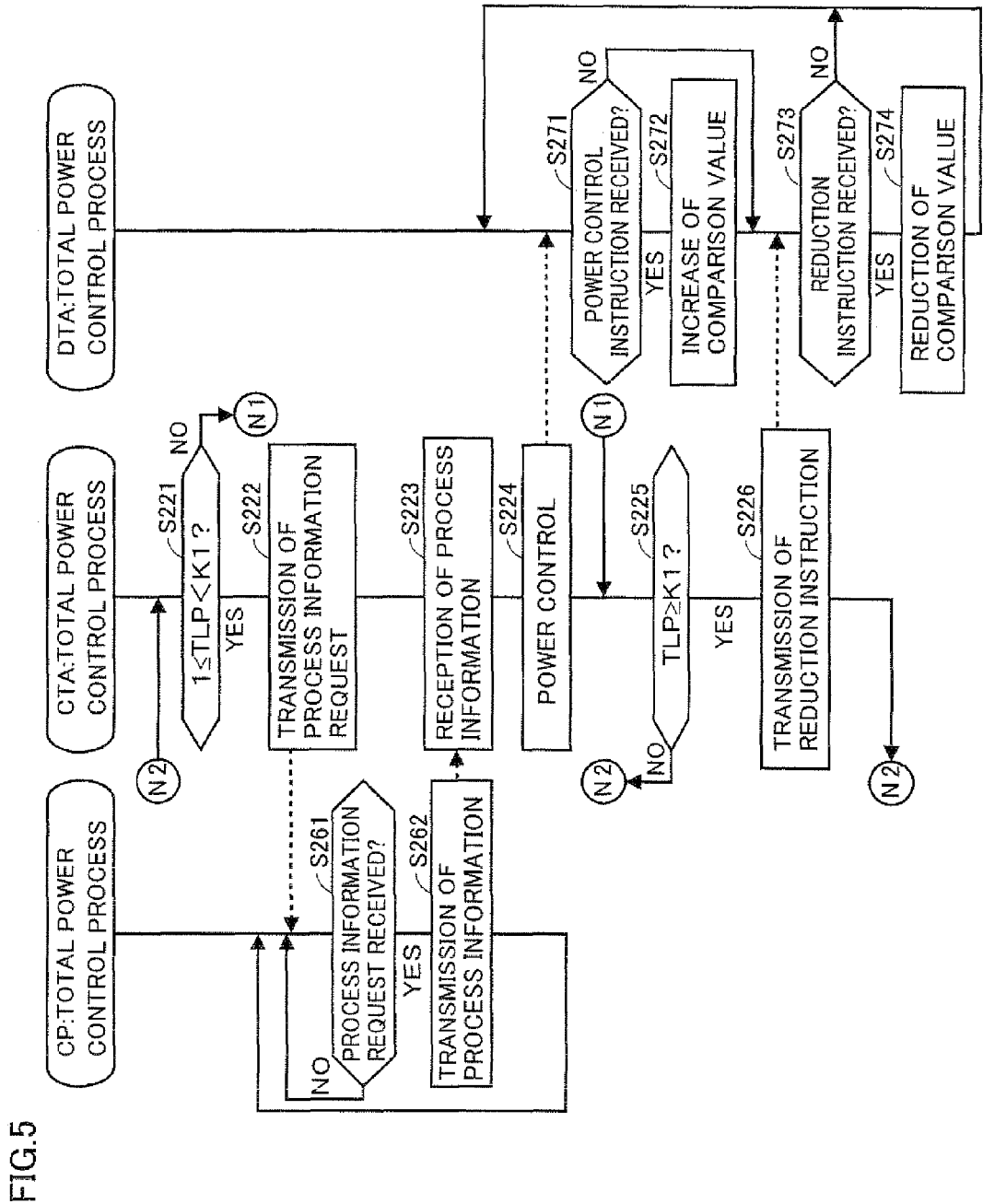
FIG. 5 is a flowchart of a total power control process CP, a total power control process CTA, and a total power control process DTA.

FIG. 5 is a flowchart of total power control process CP, total power control process CTA, and total power control process DTA. Referring to FIG. 5, the process of step S221 is first carried out in total power control process CTA.

At step S221, condition detection unit 213 detects whether the possibility of reverse power flow occurring is high or not. Here, it is assumed that reverse power flow is the flow of power from distribution unit 300 (power demanding facility 1000) to power system P100. Specifically, condition detection unit 213 reads out from memory 212 the latest power value TLP obtained by power measurement process CT of FIG. 4, at the current point of time, and identifies whether the read power value TLP is within a predetermined range. It is assumed that the values in the predetermined range are those indicating that the possibility of the power flowing through power line PL10 will run in the direction from distribution unit 300 to power system P100 is high. In other words, a value in the predetermined range indicates that the possibility of reverse power flow occurring is high. It is assumed that the values of the predetermined range are prestored in memory 212.

When the detected result from condition detection unit 213 indicates that power value TLP is a negative value, detection is made that reverse power flow is occurring. When power value TLP indicates a positive value in vicinity to 0, detection is made that the possibility of reverse power flow occurring is high. By way of example, it is assumed that the value in the predetermined range is greater than or equal to 1, and less than a positive predetermined value K1. Predetermined value K1 is prestored in memory 212.

It is assumed that 1% of the maximum output value of the power of power control system 10000 is predetermined value K1. Further, the maximum output value of the power of power control system 10000 is 90 kW. In this case, predetermined value K1 is 900 (W).

When detection is made that the condition of ($1 \leq TLP < K1$) is established, i.e. the possibility of reverse power flow occurring is high at step S221 (YES at step S221), control proceeds to step S222. When detection is made that the condition is not established, i.e. the possibility of reverse power flow occurring is not high (NO at step S221), control proceeds to step S225. Here, it is assumed that power value TLP is 300 (W), by way of example. In this case, control proceeds to step S222.

At step S222, CPU 211 sends a process information request to the plurality of power storage devices 600 in power demanding facilities 1000. A process information request is to request information indicating the process currently carried out by power storage device 600 (charging process or discharging process). Then, the process of step S222 ends.

In total power control process CP, the process of step S261 is first carried out.

At step S261, CPU 611 detects whether a process information request has been received from control unit 210. In the event of detecting reception (YES at step S261), control proceeds to step S262; otherwise (NO at step S261), the process of step S261 is carried out again. It is now assumed that a process information request is received, and control proceeds to step S262.

At step S262, control unit 610 transmits process information to power control device 200. The process information indicates the process (charging process or discharging process) currently being performed by a corresponding power storage device 600. When power storage device 600 is performing a charging process, the transmitted process information indicates a charging process. When a discharging process is currently performed, the transmitted process information indicates a discharging process. When neither a charging process nor a discharging process is carried out, the transmitted process information indicates a process stop. Then, the process of step S261 is carried out again.

In total power control process CTA, control proceeds to step S223 after the process of step S222.

At step S223, a process information reception process is carried out. In the process information reception process, control unit 210 receives process information. The process information includes information to identify a power storage device 600 sending the relevant process information. In the event of detecting the process information being received from all power storage devices 600 sending a process information request, CPU 211 ends this process information reception process, and proceeds to step S224. Control unit 210 analyzes the received process information to identify which among the plurality of power storage device 600 in power control system 10000 is performing a charging process or discharging process.

At step S224, a power control process is carried out. In a power control process, power control unit 214 of control unit 210 generates and transmits a power control instruction to power measurement device 700 in each of all power demanding facilities 1000 presenting the process information to its own device (power control device 200).

A power control instruction is generated based on the analyzed result of the received process information, and is transmitted towards each power storage device 600 of a relevant power demanding facility 1000. Specifically, the power control instruction transmitted towards a power storage device 600 performing a discharging process instructs execution of a process to suppress the amount of power supplied in the direction towards power system P100 by a discharging process. Further, a power control instruction transmitted towards a power storage device 600 performing a charging process instructs execution of a process to increase the power charged in a corresponding storage battery BT20 by a charging process.

Specifically, a power control instruction is to instruct increase of a comparison value L1 that will be used in a process carried out by power measurement device 700 described afterwards, by just a predetermined value (for example, 5). Comparison value L1 is referred to for comparison with the value of power flowing through power line PL30 (in-facility measured power value), and indicates a value in vicinity to zero. Then, the process of step S224 ends.

In a total power control process DTA, the process of step S271 is first carried out. Here, it is assumed that each control unit 710 in the plurality of power measurement devices 700 included in respective power demanding facilities 1000 in power control system 10000 stores in advance a comparison value L1 that will be used in a process described afterwards in memory 712.

At step S271, CPU 711 of control unit 710 detects whether a power control instruction is received or not. In the event of detecting reception (YES at step S271), control proceeds to step S272; otherwise (NO at step S271), control proceeds to step 273 that will be described afterwards. Here, it is assumed that a power control instruction is received, so that control proceeds to step S272.

At step S272, a comparison value increase process is carried out. In a comparison value increase process, CPU 711 increments comparison value L1 in memory 712 based on the power control instruction. Let the initial value comparison value L1 be the value of 1% the maximum output of power generation device 500. It is assumed that the maximum output of power generation device 500 is 3 kW. In this case, the initial value of comparison value L1 is 30 (W). It is also assumed that the power control instruction is directed to increasing comparison value L1 by "5". By the process of step S272, comparison value L1 becomes "35". Then, control proceeds to step S273.

At step S273, CPU 711 detects whether a reduction instruction of reducing comparison value L1 that will be described afterwards is received or not. In the event of reception (YES at step S273), control proceeds to step S274; otherwise (NO at step S273), the process of step S271 is carried out again. Here, it is assumed that a reduction instruction is not received, so that the process of step S271 is carried out again.

In total power control process CTA, control proceeds to step S225 after the process of step S224.

At step S225, CPU 211 detects whether the possibility of reverse power flow occurring is low or not. As mentioned above, reverse power flow is the flow of power from distribution unit 300 (power demanding facility 1000) towards power system P100.

Specifically, at step S225, condition detection unit 213 detects whether the latest power value TLP detected by power measurement process CT of FIG. 4 is currently greater than or equal to the positive predetermined value K1 (900) set forth above. Specifically, condition detection unit 213 detects whether the detected latest power value TLP (the direction of power flowing through power line PL10) is a value indicating low possibility of attaining the direction from distribution unit 300 to power system P100.

Specifically, in the event of detecting the condition of (TLP≥K1) being established (YES at step S225), control proceeds to step S226; otherwise (NO at step S225), control proceeds to return to step S221. Here, it is assumed that the latest power value TLP is less than predetermined value K1, so that the process of step S222 is carried out again.

Then, comparison value L1 is incremented by a predetermined value every time the above-described process of steps S222, S261, S262, S223, S224, S271 and S272 is carried out. The process of steps S222, S261, S262, S223, S224, S271 and S272 is repeated until CPU 211 detects that power value TLP obtained in power measurement process CT of FIG. 4 indicates a value greater than or equal to the aforementioned positive predetermined value K1.

It is assumed that, when comparison value L1 becomes 50 (W), for example, CPU 211 detects that power value TLP obtained by power measurement process CT indicates a value greater than or equal to the aforementioned positive predetermined value K1 (900). In this case, the possibility of reverse power flow occurring is low. YES is detected at step S225, and control proceeds to step S226.

At step S226, CPU 211 sends a reduction instruction for comparison value L1 to any power measurement devices 700 that has sent a power control instruction at least once. The reduction instruction is to return the value of increased comparison value L1 to the initial value. This reduction instruction instructs subtracting a value (hereinafter, also referred to as "reducing value") that is smaller than the predetermined value for increasing comparison value L1 (for example, "5"), from comparison value L1 at an elapse of a predetermined time (for example, 1 second). Here, the reducing value is "1", for example.

In a reduction instruction, the step width ("1") of reducing comparison value L1 is set smaller than the step width ("5") of increasing comparison value L1. Accordingly, the reduction instruction is directed to performing control less liable to occurrence of reverse power flow. In the event of transmission of a reduction instruction, the process of step S226 ends, and the process of step S221 is carried out again.

In total power control process DTA, CPU 711 of control unit 710 detects at step S273 whether a reduction instruction is received or not, as described above. In the event of detection of receiving a reduction instruction (YES at step S273) at each of all power measurement devices 700 to which a reduction instruction is sent, control proceeds to step S274.

At step S274, a reduction process is carried out for comparison value L1. In a reduction process, CPU 711 of control unit 710 decrements the value of comparison value L1 that has been increased higher than the initial value by a designated reducing value (for example, "1") at every elapse of a predetermined time (for example, 1 second), based on the received reduction instruction.

Here, it is assumed that the reduction instruction is directed to decrementing the value by "1" at every elapse of 1 second. Further, it is assumed that the value of comparison value L1 is "50" at the point of time of receiving a reduction instruction. In this case, CPU 711 reduces the value of comparison value L1 by "1" at every elapse of "1" second. Then, the process of step S271 is carried out again.

A process to control a corresponding power storage device 600 constantly carried out at each power measurement device 700 of a power demanding facility 1000 (hereinafter, also referred to as "in-facility power control process") will be described hereinafter. The flow of current from distribution board 400 towards distribution unit 300 (power system P100) is also referred to as an in-facility reverse power flow.

The in-facility power control process is directed to controlling power storage device 600 such that in-facility reverse power flow is eliminated when in-facility reverse power flow is occurring, and that the possibility of occurrence of in-facility reverse power flow is reduced when the possibility of in-facility reverse power flow occurring is high. The in-facility power control process is also directed to controlling power storage device 600 such that the amount of power from distribution unit 300 towards distribution board 400 does not exceed the maximum value of the appropriate amount of power consumed at a corresponding power demanding facility 1000. The in-facility power control process is carried out independent of other processes.

Figure 6:
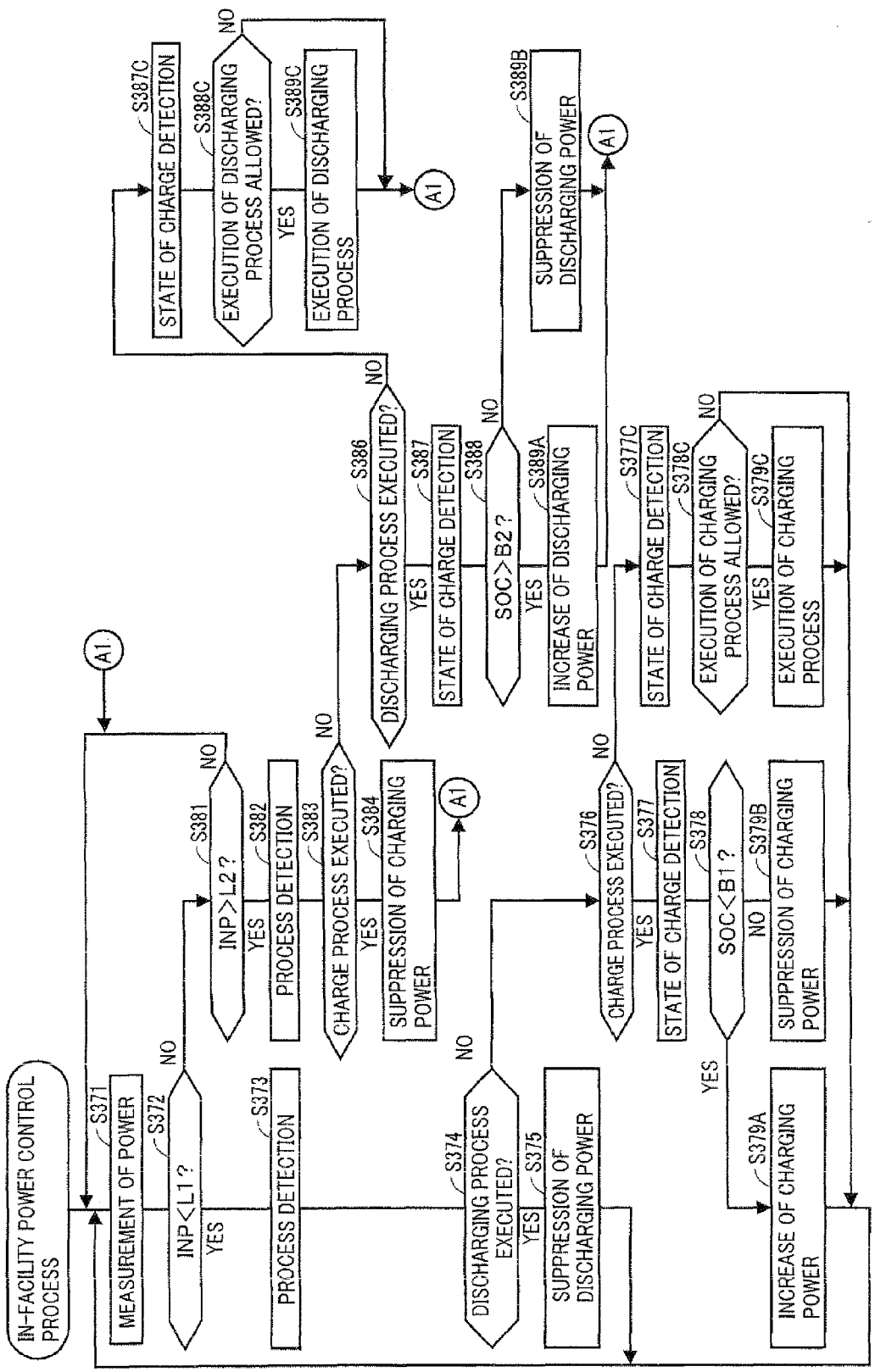
FIG. 6 is a flowchart of an in-facility power control process.

FIG. 6 is a flowchart of an in-facility power control process. Referring to FIG. 6, the process of step S371 is first carried out in the in-facility power control process.

At step S371, measurement unit 713 of control unit 710 measures the value of the current flowing through a corresponding power line PL30 and the value of voltage at node N4. Specifically, the value of power flowing through corresponding power line PL30 (hereinafter, also referred to as "in-facility power value INP") is measured (detected). The measured in-facility power value INP is stored in memory 712.

Here, it is assumed that, when in-facility power value INP is positive, the direction of the power flowing through power line PL30 is from distribution unit 300 towards a corresponding distribution board 400. When in-facility power value INP is negative, it is assumed that the direction through power line PL30 is from a corresponding distribution board 400 towards distribution unit 300 (power system P100).

At step S372, CPU 711 detects whether in-facility reverse power flow is occurring or not, and whether the possibility of in-facility reverse power flow occurring is high or not. Here, it is assumed that in-facility reverse power flow is in the direction from corresponding distribution board 400 to distribution unit 300 (power system P100).

Specifically, condition detection unit 714 detects whether in-facility power value INP measured by measurement unit 713 indicates a value less than current comparison value L1. The event of detecting that the measured in-facility power value INP indicates a value less than current comparison value L1 corresponds to the case where, for example, the value of the power consumed by corresponding electrical load 70R and corresponding power storage device 600 minus the value of power supplied from distribution unit 300 and power generation device 500 to a corresponding distribution board 400 is lower than current comparison value L1.

The detection of in-facility power value INP indicating a negative value implies that in-facility reverse power flow is occurring. The detection of in-facility power value INP indicating a positive value in vicinity to zero implies that the possibility of in-facility reverse power flow occurring is high.

It is to be noted that the value of comparison value L1 varies depending on the above-described process of steps S272 and S274 of FIG. 5, and the like.

When condition detection unit 714 detects that the condition of (INP<L1) is established at step S372 (YES at step S372), control proceeds to step S373; otherwise (NO at step S372), control proceeds to step S381 that will be described afterwards. Here, it is assumed that the current comparison value L1 is 35. Let the value of power consumed by corresponding electrical load 70R and corresponding power storage device 600 be 395 W. Let the value of power supplied to corresponding distribution board 400 be 400 W. In this case, in-facility power value INP is −5 (W). Therefore, detection is made that the condition of (INP<L1) is established (YES at step S372), and control proceeds to step S373.

At step S373, the process currently performed by corresponding power storage device 600 is detected. For this detection, CPU 711 sends a process information request to corresponding power storage device 600. A process information request is directed to requesting information indicating the process currently carried out by a corresponding power storage device 600 (a charging process or discharging process).

State detection unit 615 of control unit 610 in power storage device 600 receiving the process information request detects the type of process currently carried out by power storage device 600 under control of control unit 610. CPU 611 transmits the process information indicating the detected result to power measurement device 700. The process information indicates the process currently carried out by a corresponding power storage device 600 (charging process or discharging process). When power storage device 600 is currently performing a charging process, the transmitted process information indicates a charging process. When a discharging process is currently carried out, the transmitted process information indicates a discharging process. When neither a charging process nor a discharging process is carried out, the process information indicates a process stop.

CPU 711 of control unit 710 can detect whether a corresponding power storage device 600 is performing a process or not by receiving the process information. When a corresponding power storage device 600 is performing a process, the type of process carried out can be detected. Then, control proceeds to step S374.

At step S374, CPU 711 detects whether a corresponding power storage device 600 is performing a discharging process or not. Specifically, CPU 711 detects whether the process information received from corresponding power storage device 600 indicates a discharging process or not. In the event of detecting a discharging process (YES at step S374), control proceeds to step S375; otherwise (NO at step S374), control proceeds to step S376 that will be described afterwards. Here, it is assumed that corresponding power storage device 600 is currently performing a discharging process, so that control proceeds to step S375.

At step S375, a process to suppress power discharged by the discharging process (referred to as "discharging power suppression process") is carried out. In a discharging power suppression process, power control unit 715 sends a discharge suppression instruction to a corresponding power storage device 600. A discharge suppression instruction is directed to causing power storage device 600 to execute a process to suppress the supplied amount of power towards distribution unit 300 (power system P100) by the discharging process.

CPU 611 of control unit 610 in power storage device 600 receiving a discharge suppression instruction performs a process to suppress the amount of supplied power in the direction towards distribution unit 300 (power system P100) by the discharging process. Specifically, signal generation unit 613 generates and transmits to a relevant drive circuit 630, under control of CPU 611, an instruction 66S (hereinafter, a pulse width reduction instruction) to reduce the pulse width of a pulse signal (for example, pulse signals 61S, 62S, 63S and 64S) output from drive circuit 630.

Drive circuit 630 receiving pulse width reduction instruction 66S reduces the pulse width of the pulse signal transmitted to each IGBT. By the process set forth above, the amount of power supplied in the direction towards distribution unit 300 (power system P100) by the discharging process carried out by corresponding power storage device 600 is suppressed. In other words, the discharging power suppression process of step S375 is directed to increasing the aforementioned in-facility power value INP.

The discharging power suppression process of step S375 is directed to eliminating in-facility reverse power flow when in-facility reverse power flow is occurring, and to reducing the possibility of the occurrence of in-facility reverse power flow when the possibility of in-facility reverse power flow occurring is high. Then, the process of step S371 is carried out again.

The process of proceeding to step S376 by a determination of NO at step S374 will be described hereinafter.

At step S376, detection is made whether power storage device 600 is performing a charging process or not. Specifically, CPU 711 detects whether the process information received from a corresponding power storage device 600 indicates a charging process or not. In the event of detection indicating a charging process (YES at step S376), control proceeds to step S377; otherwise (NO at step S376), control proceeds to step S377C. Here, it is assumed that corresponding power storage device 600 is performing a charging process, so that control proceeds to step S377.

At step S377, a state of charge detection process is carried out. In a state of charge detection process, CPU 711 of control unit 710 sends a state of charge information request to a corresponding power storage device 600. The state of charge information request is an instruction directed to requesting the state of charge information. The state of charge information indicates the aforementioned state of charge value indicating the state of charge of a corresponding storage battery BT20. The state of charge value is also referred to as SOC hereinafter.

CPU 611 of power storage device 600 receiving the state of charge information request reads out the current state of charge value SOC from memory 612, and sends the state of charge information indicating the state of charge value SOC read out to power measurement device 700. CPU 711 of control unit 710 can detect the state of charge of a corresponding storage battery BT20 by receiving the state of charge information. Then, control proceeds to step S378.

At step S378 control unit 710 detects whether the state of storage battery BT20 is close to a full-charged state. Specifically, CPU 711 of control unit 710 compares state of charge value SOC indicated by the received state of charge information with comparison value B1 read out from memory 712. Based on the comparison result, detection is made whether state of charge value SOC is lower than comparison value B1, i.e. whether the condition of (SOC<B1) is established or not. Comparison value B1 is referred to in order to detect whether storage battery BT20 is at a state close to a full-charged state or not, and is prestored in memory 712. When storage battery BT20 is in a full-charged state, state of charge value SOC is 100(%). It is assumed that comparison value B1 is 98(%), by way of example.

In the event of detecting that the condition of (SOC<B1) is established (YES at step S378), control proceeds to step S379A; otherwise (NO at step S378), control proceeds to step S379B that will be described afterwards. Here, it is assumed that state of charge value SOC is less than comparison value B1, so that control proceeds to step S379A.

At step S379A, a charging power increase process is carried out. In a charging power increase process, power control unit 715 sends a charging power increase instruction to a corresponding power storage device 600. The charging power increase instruction is directed to causing a corresponding power storage device 600 to execute a process to increase the power to be stored in a corresponding storage battery BT20 by the charging process.

Control unit 610 of a power storage device 600 receiving the charging power increase instruction performs a process to increase the power to be charged in a corresponding storage battery BT20 by the charging process. Specifically, signal generation unit 613 generates and provides to a relevant drive circuit 630, under control of CPU 611, an instruction 67S (hereinafter, referred to as pulse width increase instruction) to increase the pulse width of a pulse signal (for example, pulse signals 61S, 62S, 63S and 64S) output from drive circuit 630.

Drive circuit 630 receiving pulse width increase instruction 67S increases the pulse width of the pulse signal transmitted to each IGBT based on pulse width increase instruction 67S. By the process set forth above, the power to be charged in a corresponding storage battery BT20 is increased by the charging process carried out by corresponding power storage device 600. Therefore, power storage device 600 has the receiving power increased from distribution unit 300 via distribution board 400. In other words, the charging power increase process at step S379A is directed to increasing the aforementioned in-facility power value INP.

The charging power increase process at step S379A is a process to eliminate in-facility reverse power flow when in-facility reverse power flow is occurring, and to reduce the possibility of occurrence of in-facility reverse power flow when the possibility of in-facility reverse power flow occurring is high. Then, the process of step S371 is carried out again.

The execution of the process of step S379B in response to the detection of the condition of (SOC<B1) not being established at step S378 will be described hereinafter. Detection of the relevant condition not being established corresponds to the case where the state of storage battery BT20 is close to a full-charged state. As mentioned before, when storage battery BT20 attains a full-charged state, power storage device 600 ceases the charging process, and attains a state where neither the charging process nor the discharging process is carried out.

At step S379B, a charge suppression process is carried out. In a charge suppression process, power control unit 715 transmits a charge power suppression instruction to a corresponding power storage device 600. The charge power suppression instruction is directed to causing a corresponding power storage device 600 to execute a process to suppress the power charged in a corresponding storage battery BT20 by a charging process.

Control unit 610 of power storage device 600 receiving the charge power suppression instruction performs a process to suppress power charged in a corresponding storage battery BT20 by a charging process. Specifically, signal generation unit 613 generates and transmits to a relevant drive circuit 630, under control of CPU 611, an instruction 66S (hereinafter, a pulse width reduction instruction) to reduce the pulse width of a pulse signal (for example, pulse signals 61S, 62S, 63S and 64S) output from drive circuit 630.

Drive circuit 630 receiving pulse width reduction instruction 66S reduces the pulse width of the pulse signal transmitted to each IGBT. By the above-described process, the power charged in a corresponding storage battery BT20 is suppressed by the charging process carried out by a corresponding power storage device 600. Therefore, power storage device 600 has the receiving power suppressed from distribution unit 300 through distribution board 400. Specifically, the charge suppression process of step S379B is directed to reducing the aforementioned in-facility power value INP.

The charge suppression process of step S379B is a process to facilitate in-facility reverse power flow when in-facility reverse power flow is occurring, and to cause the occurrence of in-facility reverse power flow when the possibility of in-facility reverse power flow occurring is high. Following the end of the charge suppression process, the process of step S371 is carried out again.

The process of step S379B is directed to protecting storage battery BT20 against full-charge.

According to the configuration of the present invention, even in the event of in-facility reverse power flow occurring in some of power demanding facilities 1000 in power control system 10000 and power flows towards distribution unit 300, reverse power flow towards power system P100 will not occur if another power demanding facility 1000, absent of in-facility reverse power flow, consumes more power than that supplied to distribution unit 300.

In the present invention, the process to prevent the occurrence of reverse power flow towards power system P100 includes total power control process CP, total power control process CTA, and total power control process DTA of FIG. 5. Detailed description of preventing occurrence of reverse power flow to power system P100 by total power control process CP, total power control process CTA, and total power control process DTA will be described afterwards.

At step S379B, a power generation suppression process set forth below may be carried out simultaneous to the above-described charge suppression process.

In a power generation suppression process, power control unit 715 transmits a generated power suppression instruction to a corresponding power generation device 500. The generated power suppression instruction is directed to executing a power generation suppression process to suppress the amount of power that is supplied to a corresponding distribution board 400 by a power generation process carried out by a corresponding power generation device 500.

Control unit 510 of power generation device 500 receiving a generated power suppression instruction performs a power generation suppression process to suppress the amount of power supplied to a corresponding distribution board 400 by a power generation process. Specifically, signal generation unit 513 generates and transmits to a relevant drive circuit 530, under control of CPU 511, an instruction 56S (hereinafter, a pulse width reduction instruction) to reduce the pulse width of a pulse signal (for example, pulse signals 51S, 52S, 53S, and 54S) output from drive circuit 530.

Drive circuit 530 receiving pulse width reduction instruction 56S reduces the pulse width of a pulse signal transmitted to each IGBT based on pulse width reduction instruction 56S. By the above-described process, the amount of power supplied to a corresponding distribution board 400 is suppressed. In other words, the power generation suppression process is directed to increasing the aforementioned in-facility power value INP.

In a power generation suppression process, power generation device 500 can eliminate in-facility reverse power flow, when generated, although the power obtained from solar cell BT10 cannot be utilized to the best possible degree. Thus, it is desirable to carry out a power generation suppression process simultaneous to the above-described charge suppression process at steps 379B.

The process of proceeding to step S377C by a determination of NO at step S376 will be described hereinafter. When a determination of NO is made at step S376, a corresponding power storage device 600 attains a process stop state, performing neither a charging process nor a discharging process.

At step S377C, a state of charge detection process similar to that of step S377 is carried out. Detailed description thereof will not be repeated here. By this process, control unit 710 receives state of charge information indicating state of charge value SOC, and can identify the state of charge of corresponding storage battery BT20. Then, control proceeds to step S378C.

At step S378C, corresponding power storage device 600 detects whether a charging process can be executed or not. Specifically, CPU 711 detects whether the received state of charge value SOC indicates a value lower than 98. In the event of detecting that a charging process can be executed (state of charge value SOC indicates a value less than 98) (YES at step S378C), control proceeds to step S379C; otherwise (state of charge value SOC indicates a value greater than or equal to 98) (NO at step S378C), control returns to step S371.

At step S379C, a charging process is executed. CPU 711 of control unit 710 sends a charge execution instruction to a corresponding power storage device 600. A charge execution instruction is directed to causing a corresponding power storage device 600 to execute a charging process.

Control unit 610 of power storage device 600 receiving a charge execution instruction executes a charging process. Since a charging process has been described above, detailed description thereof will not be repeated. A corresponding storage battery BT20 is charged by execution of this charging process. Therefore, power storage device 600 is allowed to receive power from distribution unit 300 through distribution board 400. The charging process executed at step S379C is directed to increasing the aforementioned in-facility power value INP.

In other words, the charging process at step S379C is directed to eliminating in-facility reverse power flow when in-facility reverse power flow is occurring, and to reducing the possibility of the occurrence of in-facility reverse power flow when the possibility of in-facility reverse power flow occurring is high. Then, the process of step S371 is carried out again.

In the case where in-facility power value INP indicates a value lower than current comparison value L1, the processes of steps S379A and S379C set forth above are carried out for feedback control such that in-facility power value INP indicates a value equal to or greater than current comparison value L1. In other words, occurrence of in-facility reverse power flow can be suppressed in each of power demanding facilities 1000 in power control system 10000.

The process of proceeding to step 381 in the event of detecting that the condition of (INP<L1) is not established at step S372 (NO at step S372) will be described hereinafter. The event of detecting that the condition of (INP<L1) is not established at step S372 corresponds to the case where the measured in-facility power value INP indicates a value greater than or equal to current comparison value L1. In this case, in-facility reverse power flow is not occurring, and the direction of power flowing through power line PL30 is in the direction from distribution unit 300 towards corresponding distribution board 400. In the following, the amount of power from distribution unit 300 towards a corresponding distribution board 400 is also referred to as an amount of consumption direction power.

At step S381, detection is made whether the amount of consumption direction power is greater than the amount of maximum appropriate consumption power. Here, it is assumed that amount of maximum appropriate consumption power is the maximum value of the amount of power appropriately consumed at a corresponding power demanding facility 1000. Namely, at step S381, detection is made whether the amount of consumption direction power exceeds the amount of maximum appropriate consumption power or not.

Specifically, CPU 711 of control unit 710 compares the measured in-facility power value INP with a determination value L2 read out from memory 712 to detect whether the condition of (INP>L2) is established or not based on the comparison result. Determination value L2 is prestored in memory 712, and is referred to in order to detect whether the amount of consumption direction power is greater than the amount of maximum appropriate consumption power.

Here, it is assumed that the value of determination value L2 is 50% the maximum output from power generation device 500. Since it is assumed that the maximum output of power generation device 500 is 3 kW as mentioned above, the value of determination value L2 designates 1500 (W). Namely, the value of amount of maximum appropriate consumption power is 1500 (W).

In the event of detecting that the condition of (INP>L2) is established (YES at step S381, control proceeds to step S382; otherwise (NO at step S381), the process of step S371 is carried out again. Detection of the amount of consumption direction power being greater than the amount of maximum appropriate consumption power is made when in-facility power value INP value is greater than determination value L2. Detection is made that the amount of consumption direction power is less than or equal to the amount of maximum appropriate consumption power, i.e. the amount of power consumed in a corresponding power demanding facility 1000 is an appropriate amount, when in-facility power value INP value is less than or equal to determination value L2, i.e. in-facility power value INP value is greater than or equal to the current value of comparison value L1, and less than or equal to determination value L2.

At step S382, the process currently carried out by a corresponding power storage device 600 is detected. Since this process is similar to that of step S373, detailed description thereof will not be repeated. By this process, control unit 710 can detect whether corresponding power storage device 600 is performing a process or not by receiving process information from corresponding power storage device 600. In the case where corresponding power storage device 600 is performing a process, the type of the process currently performed can be identified. Then, control proceeds to step S383.

At step S383, detection is made whether power storage device 600 is performing a charging process or not. Specifically, CPU 711 detects whether the process information received from corresponding power storage device 600 indicates a charging process or not. In the event of detecting that a charging process is indicated (YES at step S383), control proceeds to step S384; otherwise (NO at step S383), control proceeds to step S386 that will be described afterwards. Assuming that corresponding power storage device 600 is performing a charging process, control proceeds to step S384.

The process of step S384 is similar to the charge suppression process of step S379B. Therefore, detailed description thereof will not be repeated. By this process, the power charging a corresponding charge battery BT20 is suppressed through the charging process carried out by corresponding power storage device 600. Therefore, power storage device 600 has the receiving power from distribution unit 300 through distribution board 400 suppressed. In other words, the charge suppression process at step S384 is directed to setting the amount of consumption direction power less than or equal to the amount of maximum appropriate consumption power. Upon the end of the charge suppression process, the process of step S371 is carried out again.

A process of proceeding to step S386 by a determination of NO at step S383 will be described hereinafter.

At step S386, detection is made where a corresponding power storage device 600 is performing a discharging process or not. Specifically, CPU 711 analyzes the process information received from corresponding power storage device 600, and detects whether a discharging process is indicated or not based on the analyzed result. In the event of detecting that the process information indicates a discharging process (YES at step S386), control proceeds to step S387; otherwise (NO at step S386), control proceeds to step S387C that will be described afterwards. Assuming that a corresponding power storage device 600 is performing a discharging process, control proceeds to step S387.

The process of step S387 is similar to the state of charge detection process carried out at step S377. Therefore, detailed description thereof will not be repeated. By this process, CPU 711 of control unit 710 receives the state of charge information indicated by state of charge value SOC to identify the state of charge of a corresponding storage battery BT20. Then, control proceeds to step S388.

At step S388, CPU 711 detects whether corresponding storage battery BT20 is in a state near a discharge final state based on state of charge value SOC. As mentioned above, the discharge final state is a state where power is not stored in storage battery BT20.

Specifically, CPU 711 compares state of charge value SOC indicated by the received state of charge information with comparison value B2 read out from memory 712 to detect whether the condition of (SOC>B2) is established or not based on the comparison result. Comparison value B2 is prestored in memory 712, and is a value referred to in order to detect whether storage battery BT20 is in a state close to a discharge final state or not. In the case where storage battery BT20 is in a discharge final state, state of charge value SOC is 0(%). It is assumed that comparison value B2 indicates 5(%), by way of example.

In the event of detecting that the condition of (SOC>B2) is established (YES at step S388), control proceeds to step S389A; otherwise (NO at step S388), control proceeds to step S389B that will be described afterwards. Assuming that state of charge value SOC is greater than comparison value B2, control proceeds to step S389A.

At step S389A, a discharging power increase process is carried out. In the discharging power increase process, control unit 710 transmits a discharging power increase instruction to a corresponding power storage device 600. The discharging power increase instruction is directed to causing corresponding power storage device 600 to execute a process to increase the power discharged from a corresponding storage battery BT20 by a discharging process.

Control unit 610 of power storage device 600 receiving a discharging power increase instruction performs a process to increase the power discharged from a corresponding storage battery BT20 by a discharging process. Specifically, signal generation unit 613 generates and transmits to a relevant drive circuit 630, under control of CPU 611, an instruction 67S (hereinafter, a pulse width increase instruction) to increase the pulse width of a pulse signal (for example, pulse signals 61S, 62S, 63S and 64S) output from drive circuit 630.

Drive circuit 630 receiving pulse width increase instruction 67S increases the pulse width of a pulse signal to be transmitted to each IGBT based on pulse width increase instruction 67S. By the process set forth above, the power discharged from corresponding storage battery BT20 is increased by the discharging process carried out by corresponding power storage device 600. Therefore, the power supplied by power storage device 600 in the direction towards distribution unit 300 (power system P100) via a distribution board 400 is increased. In other words, the discharging power increase process of step S389A is a process to set the amount of consumption direction power less than or equal to the amount of maximum appropriate consumption power. Then, the process of step S371 is carried out again.

The process of proceeding to step S389B in response to detection that the condition of (SOC>B2) is not established (NO at step S388) will be described hereinafter. Detection of the relevant condition not being established corresponds to the case where a corresponding storage battery BT20 is in a state close to a discharge final state. As mentioned above, in the case where storage battery BT20 attains a discharge final state, power storage device 600 stops its discharging process, attaining a state where neither a charging process nor a discharging process is carried out.

The process carried out at step S389B is similar to the discharging power suppression process of step S375. Therefore, detailed description thereof will not be repeated. By this process, the supplied amount of power in the direction towards distribution unit 300 (power system P100) by a discharging process carried out by corresponding power storage device 600 is suppressed. Then, control proceeds to step S371 again.

The process of proceeding to step S387C when a determination is made of NO at step S386 will be described hereinafter. In the event of a determination of NO at step S386, corresponding power storage device 600 attains a process stop state where neither a charging process nor a discharging process is carried out.

The process of step S387C is a state of charge detection process similar to that of step S377. Therefore, detailed description thereof will not be repeated. By this process, control unit 710 receives state of charge information indicating state of charge value SOC to identify the state of charge of corresponding storage battery BT20. Then, control proceeds to step S388C.

At step S388C, corresponding power storage device 600 detects whether a discharging process can be executed or not. Specifically, CPU 711 detects whether the received state of charge value SOC indicates a value greater than or equal to 5. In the event of detecting that SOC is greater than or equal to 5 (YES at step S388C), control proceeds to step S389C; otherwise (NO at step S388C), control proceeds to step S371 again.

At step S389C, a discharging process is executed. In order to execute a discharging process, CPU 711 sends a discharging process execution instruction to a corresponding power storage device 600. This instruction is directed to causing a corresponding power storage device 600 to execute a discharging process.

Control unit 610 of power storage device 600 receiving the discharging process execution instruction executes a discharging process. This discharging process is similar to that described above. Therefore, detailed description thereof will not be repeated. By executing this discharging process, the power stored in corresponding storage battery BT20 is discharged. Therefore, power storage device 600 transmits power in the direction towards distribution unit 300 (power system. P100) via distribution board 400. In other words, the discharging process executed at step S389C is directed to setting the amount of consumption direction power lower than or equal to the amount of maximum appropriate consumption power. Then, the process of step S371 is carried out again.

Specific examples will be provided hereinafter to verify that the flow of power to power system P100 at power control system 10000 can be prevented by the execution of the plurality of processes set forth above.

It is assumed that the above-described power measurement process DT and power measuring process CT of FIG. 4, total power control process CP, total power control process CTA and total power control process DTA of FIG. 5, and the in-facility power control process of FIG. 6 are carried out at power control system 10000.

It is assumed that there are 30 power demanding facilities 1000 in power control system 10000. Power demanding facility 1000 in power control system 10000 is also simply referred to as a power demanding facility. Furthermore, power generation device 500 and power storage device 600 in a power demanding facility are also simply referred to as a power generation device and a power storage device, respectively. Further, power control device 200 in power control system 10000 is also simply referred to as a power control device.

It is assumed that the power generation device in each of the 30 power demanding facilities is performing a power generation process during the daytime when the sunlight is most intense. In this case, it is assumed that the value of power generated by each power generation device performing a power generation process is the maximum value of 3 kW.

Let the value of comparison value L1 stored by control unit 710 of power measurement device 700 included in each of the 30 power demanding facilities be the initial value of 30 (W). Let power value TLP first obtained by a power measurement process CT of FIG. 4 by the power control device be 1000 (W) that is greater than or equal to predetermined value K1 (900 (W)). In this case, the power control device repeats the processes of steps S221 and S225 of FIG. 5.

It is also assumed that 20, among the 30 power demanding facilities, are in a state where a determination of YES is made at step S372 in the in-facility power control process of FIG. 6. The power demanding facility in a state corresponding to a determination of YES at step S372 in the in-facility power control process is a facility where in-facility reverse power flow is occurring or the possibility of occurrence of reverse power flow in-facility is high.

A power demanding facility in a state where a determination of YES is made at step S372 in the in-facility power control process is also referred to as a first power demanding facility. It is assumed that the power storage device in each of the 20 first power demanding facilities is performing a charging process. It is also assumed that storage battery BT20 in each of the 20 first power demanding facilities is in a power chargeable state.

In this case, power measurement device 700 in each of the 20 first power demanding facilities repeatedly performs the process of steps S371, S372, S373, S374, S376, S377, S378 and S379A in the in-facility power control process of FIG. 6. By the process, each of the 20 first power demanding facilities charges a corresponding storage battery BT20 with the power obtained from a corresponding power generation device.

It is assumed that the remaining 10 power demanding facilities other than the 20 first power demanding facilities, among the 30 power demanding facilities, attain a state where a determination of NO is made at step S372 in the in-facility power control process of FIG. 6. The power demanding facility in a state where a determination of NO is made at step S372 in the in-facility power control process is a facility where the possibility of occurrence of the in-facility reverse power flow is low.

A power demanding facility in a state where a determination of NO is made at step S372 in the in-facility power control process is also referred to as a second power demanding facility.

Power measurement device 700 in each of the 10 second power demanding facilities performs a process of any of steps S371, S372, S381, S382, S383, S384, S386, S387, S388, S389A, S389B, S387C, S388C and S389C in the in-facility power control process of FIG. 6.

It is assumed that, among the 20 first power demanding facilities repeatedly performing the process of steps S371, S72, S373, S374, S376, S377, S378 and S379A, storage battery BT20 in each of 10 power demanding facilities attains a state close to a full-charged state, and power measurement device 700 in each of the relevant 10 power demanding facilities performs the process of step S379B, instead of step S379A. Accordingly, it is assumed that in-facility reverse power flow occurs at the 10 power demanding facilities where corresponding power measurement device 700 performs the process of step S379B.

Under this state, it is assumed that power value TLP obtained by power measurement process CT of FIG. 4 by the power control device attains 700 (W) that is a value lower than predetermined value K1 (900 (W)). In this case, the possibility of the occurrence of reverse power flow where the flow of power through power line PL10 is in the direction from distribution unit 300 towards power system P100 is high. It is assumed that, among the 30 power demanding facilities, there are 20 power demanding facilities having a corresponding power measurement device 700 not performing the process of step S379B.

In this case, the power control device performs the process of steps S222, S223 and S224 of FIG. 5 to transmit the aforementioned power control instruction to power measurement device 700 included in each of all the power demanding facilities presenting the process information to its own device (power control device). The 10 second power demanding facilities are included in said all power demanding facilities receiving a power control instruction.

Power measurement device 700 receiving a power control instruction increases comparison value L1 by just a predetermined value (for example 5). Accordingly, the probability of a power demanding facility attaining a state in which a determination of YES is made at step S372, among the 10 second power demanding facilities, increases. The second power demanding facility attaining the state in which a determination of YES is made at step S372 in the in-facility power control process by incrementing comparison value L1 is also referred to as a third power demanding facility. The third power demanding facility is a facility without occurrence of in-facility reverse power flow, and the possibility of occurrence of in-facility reverse power flow is low.

It is assumed that 5 second power demanding facilities, among the 10 second power demanding facilities, has transformed to the third power demanding facility by the increment of comparison value L1.

In this case, power measurement device 700 in each of the 5 third power demanding facilities performs the process of step S375 or step S379A in the in-facility power control process of FIG. 6. Accordingly, the third power demanding facility having a corresponding power storage device performing a discharging process, among the 5 third power demanding facilities, has the amount of power supplied in the direction towards distribution unit 300 (power system P100) suppressed. Further, the third power demanding facility having a corresponding power storage device performing a charging process, among the 5 third power demanding facilities, has the power charged in a corresponding storage battery BT20 increased.

Therefore, power value TLP obtained by the power control device through power measurement process CT of FIG. 4 increases. Then, when power value TLP becomes greater than or equal to predetermined value K1 (900 (W)), i.e. the possibility of occurrence of reverse power flow where the flow of power is in the direction from distribution unit 300 (power demanding facility 1000) towards power system P100 becomes lower, the power control device performs the process of step S226 of FIG. 5 to transmit a reduction instruction to any power measurement device 700 that has transmitted a power control instruction at least once.

Power measurement device 700 receiving a reduction instruction reduces the value of increased comparison value L1 by a decrement value (for example, 1) lower than the predetermined value (for example 5), at every elapse of a predetermined time (for example, 1 second).

By decreasing the value of comparison value L1 by the above-described method, control can be provided such that the direction of power flowing through power line PL10 is less likely to run in the direction from distribution unit 300 towards power system P100. Further, by reducing the value of comparison value L1 by the above-described method when power value TLP becomes greater than or equal to predetermined value K1, power value TLP can be prevented from becoming too large.

By the process set forth above, occurrence of reverse power flow where the flow of power is in the direction from distribution unit 300 (power demanding facility 1000) towards power system P100 can be prevented. Specifically, increase of the distributed voltage of power system P100 can be prevented to avoid adversely affecting power system P100.

In the present embodiment, a plurality of power storage devices in power control system 10000 may be configured to carry out a charging process to suppress reverse power flow. As such, a plurality of power storage devices has a corresponding storage battery BT20 attaining a full-charged state, lowering the possibility of a charging process not being able to carry out, as compared to the case where one power storage device is used. Therefore, a reverse power flow suppression process of high reliability can be carried out. Further, since charging power is distributed among a plurality of storage batteries corresponding to respective power storage devices, the charging rate can be suppressed. Thus, the load on the storage battery can be reduced to allow the lifetime of the storage battery to be increased.

In the case where power is to be charged in storage battery BT20 in the present embodiment, a process of identifying the state of storage battery BT20 is carried out in advance. Accordingly, a charging operation on a storage battery BT20 in a full-charged state can be prevented, ensuring safety.

Further, in the case where the possibility of occurrence of reverse power flow where power flows from distribution unit 300 (power demanding facility 1000) towards power system P100 is low, i.e. when power value TLP is greater than or equal to predetermined value K1, the power storage device is controlled such that in-facility, reverse power flow does not occur at each power demanding facility. Thus, there can be provided a power control system in which reverse power flow where power flows towards power system P100 from distribution unit 300 (power demanding facility 1000).

Since a process of suppressing the amount of power output by the power generation process through power generation device 500 is not carried out in the present embodiment, the power obtained at power generation device 500 from solar cell BT10 can be utilized to the best possible degree.

In the present embodiment, power control system 10000 including a plurality of power demanding facilities 1000 performs control to avoid occurrence of reverse power flow from a power receiving portion at one time, and the power storage device in each of power demanding facilities 1000 can be used effectively under centralized control by power control device 200. As a result, there can be provided a power control system capable of storing surplus power at the power storage device without having to suppress output from the power generation device.

Thus the present invention provides the advantage of allowing effective usage of power while preventing the flow of power towards power system P100.

A phenomenon caused by transmitting a power control instruction to power measurement device 700 in each of all power demanding facilities 1000 will be described hereinafter.

Power measurement device 700 receiving a power control instruction increments the value of comparison value L1 by just a predetermined value (for example, 5). Accordingly, the probability of a second power demanding facility in a state having a determination of NO at step S372 in the in-facility power control process of FIG. 6 transforming to a third power demanding facility in a state having a determination of YES made at step S372 increases. Power measurement device 700 in each of a plurality of third power demanding facilities having a corresponding power storage device performing a charging process or a discharging process executes the process of step S375 or step S379A in the in-facility power control process of FIG. 6.

Therefore, increase of comparison value L1 causes power storage device 600 performing the discharging process to execute a suppression process of suppressing the supplied amount of power in the direction towards power system P100 by a discharging process. Further, increase of comparison value L1 causes power storage device 600 performing a charging process to execute an increase process of increasing the power charged to a corresponding storage battery BT20 by a charging process.

Therefore, the probability of performing a suppression process at a power storage device 600 in power demanding facility 1000 receiving a power control instruction, when a discharging process is carried out, increases. Further, the probability of performing an increase process at a power storage device 600 in power demanding facility 1000 receiving a power control instruction, when a charging process is carried out, increases.

Measurement units 113, 513, 613, and 713, signal generation units 513 and 613, and state detection unit 615 may be implemented by circuits alone, or by a combination of software and circuits.

It should be understood that the embodiments disclosed herein are illustrated and non-restrictive in every respect. The scope of the present invention is defined by the terms of the claims, and is intended to include any modification within the scope and meaning equivalent to the terms of the claims.

INDUSTRIAL APPLICABILITY

The present invention is effective in a power control system distributing power supplied from a power system to a plurality of power demanding facilities.

DESCRIPTION OF THE REFERENCE CHARACTERS

PL10 power line; BT10 solar cell; BT20 storage battery; P100 power system; 50 transformer; 100 power measurement device; 110, 210, 610, 710 control unit; 200 power control device; 300 distribution unit; 400 distribution board; 500 power generation device; 600 power storage device; 700 power measurement device; 1000 power demanding facility; 10000 power control system.

The invention claimed is:

1. A power control system comprising:
a plurality of power demanding facilities,
a distribution unit including a first connection unit to which an external power system is connected and a second connection unit to which said plurality of power demanding facilities are connected, and
a measurement unit measuring a value of running power that is power flowing between said power system and said distribution unit,
said distribution unit distributing power supplied from said power system via said first connection unit to said plurality of power demanding facilities,
each of said plurality of power demanding facilities including
a power generation device generating and providing power generated by said power generation device to said second connection unit, and
a power storage device having a storage battery connected, and receiving power supplied by said power system and distributed from said distribution unit,
said power storage device performing a charging process of storing power received by said power storage device in the connected storage battery, and a discharging process of providing at least a portion of stored power from a relevant storage battery to said second connection unit,
said power control system further comprising:
a condition detection unit detecting whether a condition of (TLP<K1) is established or not, and
a power control unit transmitting a power control instruction to said plurality of power demanding facilities when said condition detection unit detects that said condition is established,
said TLP indicating a power of said running power flowing between the power system and the distribution unit measured by said measurement unit when a direction of said running power flowing from said power system towards said distribution unit is taken as a positive value, and said K1 indicating a threshold value used to detect reverse power flow indicative of said running power flowing from said distribution unit towards said power system,
said power control instruction instructing said power storage device performing said discharging process to suppress an amount of power output from said storage battery, and instructing said power storage device performing said charging process to increase the amount of power charged in said storage battery.

2. The power control system according to claim 1, further comprising:
a process information reception unit receiving, from each of said plurality of power demanding facilities, process information indicating a process carried out by said power storage device in a relevant power demanding facility with respect to said storage battery connected to the relevant power storage device,
wherein said power control unit transmits said power control instruction to said plurality of power demanding facilities based on said process information received by said process information reception unit.

3. The power control system according to claim 1, wherein said power storage device receives power distributed from said distribution unit, and power output from said power generation device in said plurality of power demanding facilities,
said charging process indicate at least one of a first charging process of storing at least a portion of power distributed from said distribution unit in said storage battery, and a second charging process of storing at least a portion of power output from said power generation device of said plurality of power demanding facilities in said storage battery.

4. The power control system according to claim 1, wherein said power storage device comprises a current capacity value detection unit detecting a capacity value of current stored in said storage battery connected, and
detecting whether charging of a relevant storage battery is allowed or not based on said current capacity value detected by said current capacity value detection unit.

5. The power control system according to claim 4, wherein said power storage device increases the amount of power to be charged in said storage battery connected in an event of detecting that said charging is allowed.

6. The power control system according to claim 1, wherein each of said plurality of power demanding facilities comprises
an in-facility measurement unit measuring a value and flowing direction of an in-facility power that is power flowing between said distribution unit and said power storage device, and
an in-facility control unit performing an internal power control process such that said in-facility power is increased when a condition of (INP<L1) is established,
said INP indicates said measured in-facility power when a direction from said distribution unit towards said power storage device is taken as a positive value, and said L1 indicates an in-facility threshold value used to detect power flowing from said power storage device towards said distribution unit,
said in-facility control unit increases said in-facility threshold value by just a predetermined value when said power control instruction is received.

7. The power control system according to claim 6, wherein when a corresponding power storage device is performing said discharging process, said internal power control process indicates a process of suppressing a supply amount of power to said distribution unit by said discharging process, and
when a corresponding storage battery is in a chargeable state, and said corresponding power storage device is performing said charging process, said internal power control process indicates a process of increasing power to be charged in said corresponding storage battery by said charging process.

8. The power control system according to claim 6, wherein said in-facility threshold value indicated by said L1 is a value in vicinity to 0.

9. The power control system according to claim 1, wherein said power control unit controls, until establishment of a condition of (TLP≤K1) is detected, said power storage device performing said discharging process such that the amount of power output from said storage battery connected to the relevant power storage device is suppressed, and said power storage device performing said charging process such that the amount of power charged in said storage battery connected to the relevant power storage device is increased.

10. The power control system according to claim 1, wherein said threshold value indicated by said K1 is a value in vicinity to 0.

11. The power control system according to claim 1, wherein said power generation device is a photovoltaic unit.

12. A method for controlling a power system, said power system including
- a plurality of power demanding facilities,
- a distribution unit including a first connection unit to which an external power system is connected and a second connection unit to which said plurality of power demanding facilities are connected, and
- a measurement unit measuring a value of running power that is power flowing between said power system and said distribution unit,
- said distribution unit distributing power supplied from said power system via said first connection unit to said plurality of power demanding facilities, and providing power applied via said second connection unit to said power system via said first connection unit,
- each of said plurality of power demanding facilities including
- a power generation device generating and providing power generated by said power generation device to said second connection unit, and
- a power storage device having a storage battery connected, and receiving power supplied by said power system and distributed from said distribution unit or power output from said power generation device,
- said power storage device performing a charging process of storing power received by said power storage device in the connected storage battery, and a discharging process of providing stored power from a relevant storage battery to said second connection unit, said method comprising the steps of:
- detecting whether a condition of (TLP<K1) is established or not, and
- in an event of detecting that said condition is established, transmitting a power control instruction to said plurality of power demanding facilities,
- said TLP indicating a power of said running power flowing between the power system and the distribution unit measured by said measurement unit when a direction of said running power flowing from said power system towards said distribution unit is taken as a positive value, and said K1 indicating a threshold value used to detect reverse power flow indicative of said running power flowing from said distribution unit towards said power system,
- said power control instruction instructing said power storage device performing said discharging process to suppress an amount of power output from said storage battery, and instructing said power storage device performing said charging process to increase the amount of power charged in said storage battery.

* * * * *